United States Patent [19]

Adams

[11] Patent Number: 4,571,925

[45] Date of Patent: Feb. 25, 1986

[54] INSERTION MACHINE WITH POSTAGE CATEGORIZATION

[75] Inventor: Jerryl Adams, Easton, Pa.

[73] Assignee: Bell and Howell Company, Phillipsburg, N.J.

[21] Appl. No.: 502,891

[22] Filed: Jun. 9, 1983

[51] Int. Cl.[4] .............................................. G01G 23/28

[52] U.S. Cl. .......................................... 53/502; 53/54; 53/168; 53/266 A

[58] Field of Search ................. 53/502, 504, 501, 498, 53/493, 54, 51, 168, 266 A; 364/466; 177/1

[56] References Cited

U.S. PATENT DOCUMENTS 3,484,100 12/1969 Sather et al. .......................... 270/58
3,606,728 9/1971 Sather et al. ............................ 53/54
3,652,078 3/1972 Sather et al. .......................... 270/58
3,877,531 4/1975 Storace et al. .......................... 177/1
4,308,579 12/1981 Dlugos ................................ 364/200
4,345,193 8/1982 Barger et al. ................... 364/466 X
4,366,552 12/1982 Uchimura et al. ............. 364/466 X

*Primary Examiner*—James F. Coan
*Attorney, Agent, or Firm*—Griffin, Branigan, and Butler

[57] ABSTRACT

In an insertion machine a track 20 moves groups of items past feed stations 30, 32, 34, 36, 38, 40 and 42 during respective machine cycles. The feed stations selectively feed items, onto the track 20 for inclusion with a group of items and eventual stuffing into an envelope to which postage need be applied.

In order for data processing means 102 to calculate the amount of postage necessary, an operator uses a keyboard and display 110 to input predetermined per item weight values for items held at select stations. The data processing means 102 uses the predetermined values indicative of the per item weight of items held in the stations to obtain a calculated total weight for each group of items.

38 Claims, 13 Drawing Figures

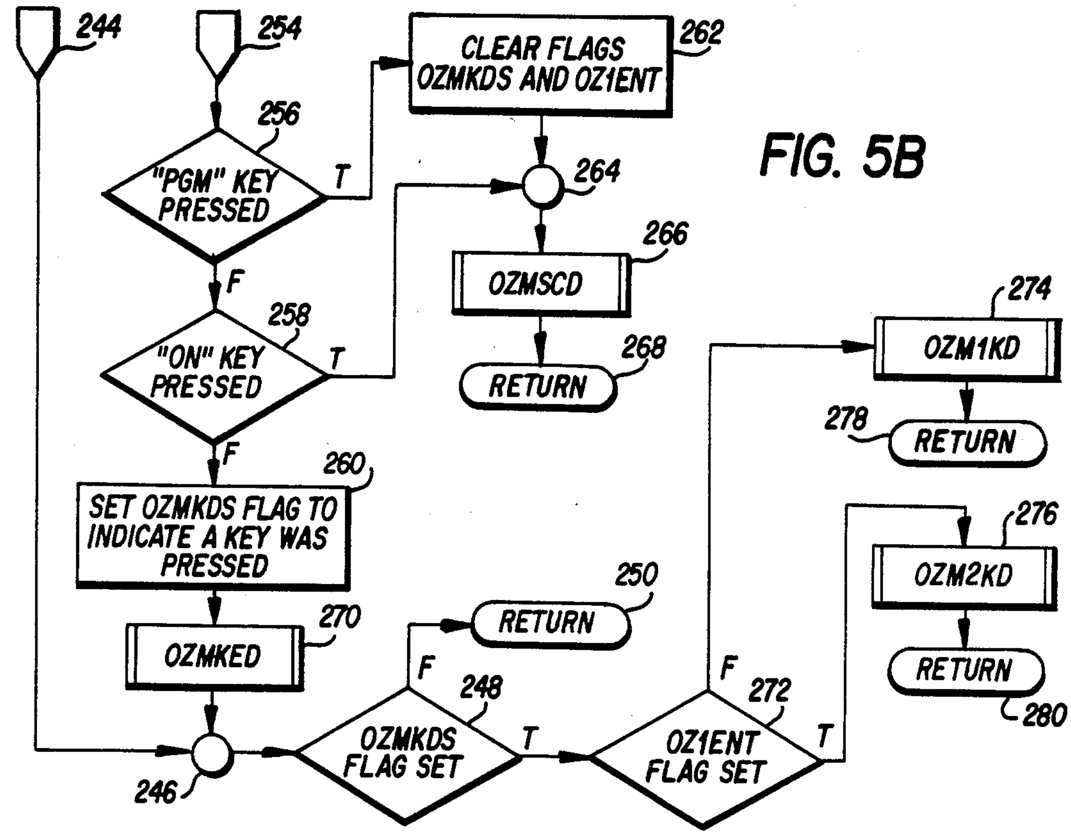
FIG. 5B
FIG. 2
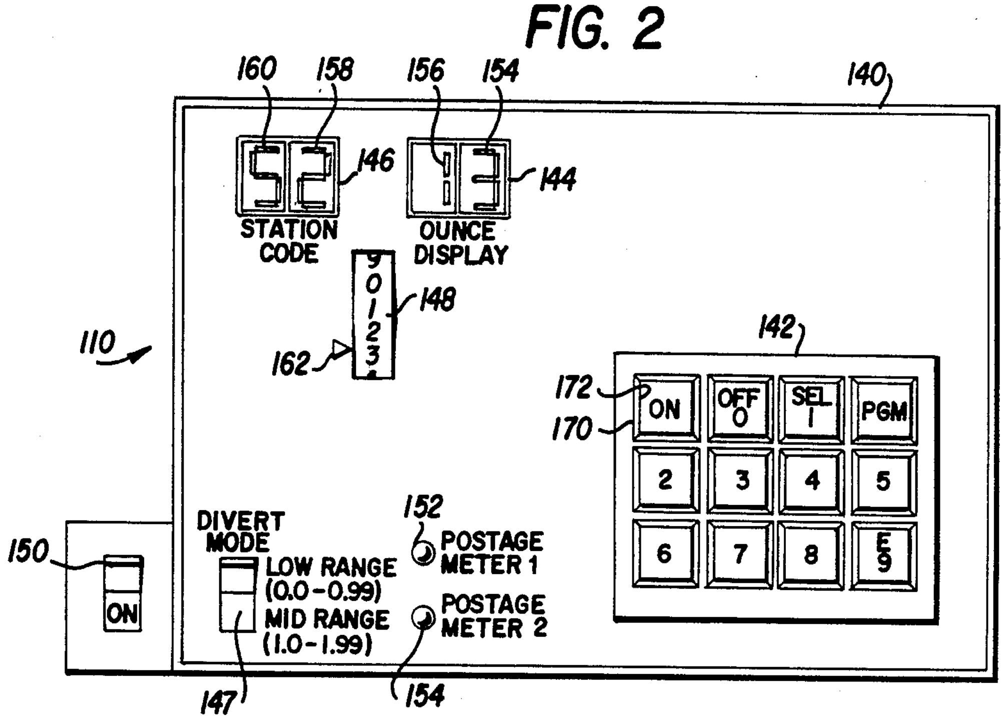

| VALUE SELECTED ON THUMBWHEEL | SELECTED STATION DISPLAY CODE | STATION |
|---|---|---|
| 0 | SF | SHEET FEEDER |
| 1 | FL | CHECK FEEDER (LONG CHECKS) |
| 2 | FS | CHECK FEEDER (SHORT CHECKS) |
| 3 | S2 | INSERT STATION 2 |
| 4 | S3 | INSERT STATION 3 |
| 5 | S4 | INSERT STATION 4 |
| 6 | S5 | INSERT STATION 5 |
| 7 | E | ENVELOPE STATION |
| 8 | (FLASH)00 | INVALID |
| 9 | (FLASH)00 | INVALID |

INSERTION MACHINE WITH POSTAGE CATEGORIZATION

A microfiche appendix comprised of a single microfiche having 34 frames was included with the application for this patent.

This invention relates to an improved multi-station insertion machine and to a method of operating the same.

U.S. Pat. Nos. 2,325,455 and 3,260,516 relate to multistation inserters which are presently produced and marketed by the assignee of the present application and well-known in the market as the Phillipsburg inserters. In the insertion machines of these patents a master control document is withdrawn from a master control document station and moved onto an inserter track which has a suitable conveyor means for moving the master control document past a plurality of insertion stations. As the master control document is thusly moved, additional documents from the insertion stations are stacked with the master control document. The master control document and its insertions are then inserted into a mailing envelope by well-known means.

U.S. Pat. No. 3,260,517 is particularly directed to an improvement of U.S. Pat. No. 2,325,455 and related to a device for deriving signals from particular master control documents and using those signals to control the subsequent selective insertion of documents from only selected insertion stations.

Once the control document and its insertions have been inserted into the mailing envelope, a determination must be made regarding the amount of postage to be applied to the envelope. However, insertion machines of the type described above are utilized in many environments in which it is difficult to make an accurate determination of the correct postage for each envelope.

As an example of this difficulty, in the banking industry envelopes are mailed monthly to customers and include such enclosures as a statement of account, informational enclosures, and cancelled checks. With respect to informational enclosures, banks may send certain general interest enclosures to all customers while also enclosing one or more of many special interest enclosures to select or targeted customers in accordance with the bank's estimation of the pertinence of the enclosure relative to each customer. Therefore, the weight of the envelopes mailed by the bank can vary considerably from customer to customer depending on, for example, the number of cancelled checks, the length (and hence weight) of each cancelled check, and the number of items such as informational enclosures which are inserted in a customer's envelope.

U.S. Pat. No. 3,606,728 to Eugene Sather et al., commonly assigned herewith, provides a method and apparatus for removing overweight envelopes from an inserter track prior to passage to a postage meter. In setting up the apparatus of U.S. Pat. No. 3,606,728, a initial determination is made regarding the expected average weight of an envelope containing a statement sheet and the maximum possible weight of the maximum number of informational inserts to be included therein. Next, based upon the initial determination, a second determination is made of the number of checks required to increase the overall weight of a given envelope and contents to an amount in excess of the postage for which the meter is set. This number of checks is entered into an overweight selector which is operative to produce a signal representative of a number of checks in excess of which would require additional postage.

In accordance with the basic teaching of U.S. Pat. No. 3,606,728, some current inserter machines have two in-line postage meters—a first postage meter for applying postage to envelopes having a weight within a first range (0.00 ounces to 1.00 ounces, for example) and a second postage meter for applying postage to envelopes having a weight within a second range (1.00 ounces to 2.00 ounces). In the manner of U.S. Pat. No. 3,606,728, the user determines a first preset count indicative of the number of checks which would make the envelope too heavy and hence not eligible for the first range, as well as a second preset count indicative of the number of checks which would make the envelope too heavy and hence not eligible for the second range. Such inserter machines read a binary code indicative of the number of cancelled checks that are to be inserted into the envelope and, based on a comparision of the read value to the first and second preset counts, diverts the envelope either toward the first postage meter, the second postage meter, or to a location for special handling.

As mentioned above, the preset counts indicative of the number of cancelled checks to be inserted into an envelope must take into consideration the maximum possible weight of the maximum possible number of non-check items which are also inserted into the envelope. When the actual weight of the non-checks items in a given envelope is less than this maximum, envelopes can be assigned an unnecessarily high weight category.

Moreover, in the industry it is common to have commercial checks of relatively long length (and hence greater weight) and checks of shorter length (and hence lesser weight), such as personal checks. If it is improperly assumed that all the checks are either long length checks or short length checks, the envelopes can be assigned to an incorrect weight category.

Hence, an object of the present invention is the provision of an inserter machine which accurately determines the weight of an envelope and its associated inserts.

An advantage of the present invention is the provision of an inserter machine which, by accurate determination of the weight of an envelope and its associated inserts, results in a substantial financial savings.

A further advantage of the present invention is the provision of an inserter machine which is easily operated for determining the accurate weight of an envelope and its associated contents.

Yet another advantage of the present invention is the provision of an inserter machine which discriminates between long length inserts and short length inserts in determining the accurate weight of an envelope and its associated contents.

SUMMARY

An insertion machine receives keyboard inputs relative to per item weights for selected feed stations of the insert machine. In an automatic mode wherein each station feeds inserts onto a conveyor travelling thereby, a calculation of the weight of an envelope stuffed with a group of related items is made upon the feeding of a first item. The weight calculation is categorized into one of a plurality of weight range classifications with respect to the application of postage to the stuffed envelope. Stuffed envelopes calculated to be overweight are marked and diverted to an overweight conveyor. Appropriate ones of a plurality of postage meters are activated to apply a suitable amount of postage to stuffed envelopes travelling thereby if the calculated weight of the stuffed envelope is classified to be in a weight range corresponding to the setting of the particular postage meter. Envelopes having calculated weights in particular weight ranges are diverted to conveyors other than a main conveyor.

In another mode indicia on a control document fed from a first station determines which particular downstream stations are to feed items onto the conveyor. The indicia also determines how many items are to be fed from at least one other station, in particular a fast feeder station. The fast feeder station is a dual-length station capable of feeding both long length and short length items onto the conveyor, the long length items and short length items having differing weights.

In the control mode, upon the feeding of the indicia-bearing item from the first station a calculated tenative weight is derived by data processing means for the group of related items to be deposited on the conveyor on the basis of per item weight information input by the user with respect to select stations. In this regard, the calculated tenative weight is said to be tenative inasmuch as the calculations presume that all the items fed from the dual length fast feeder station are short length items. Subsequent to the tenative calculations the dual length fast feeder station feeds its items. As the dual length feeder feeds, a length sensor proximate the dual length station senses the feeding of long length items so that a count thereof can be maintained by the data processing means. Once all the items have been fed from the dual length fast feeder, the calculated weight for the group of related documents is modified if so required by the presence of long length items and an accurate final weight is maintained. The processing of postage application to the stuffed envelopes is based on the calculated final weight.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2 is a front view of a keyboard and display panel of an insertion machine of an embodiment of the invention;

FIGS. 5A and 5B are diagrams depicting processing steps executed by a specialized routine OZM;

DETAILED DESCRIPTION OF THE DRAWINGS

Figure 1:
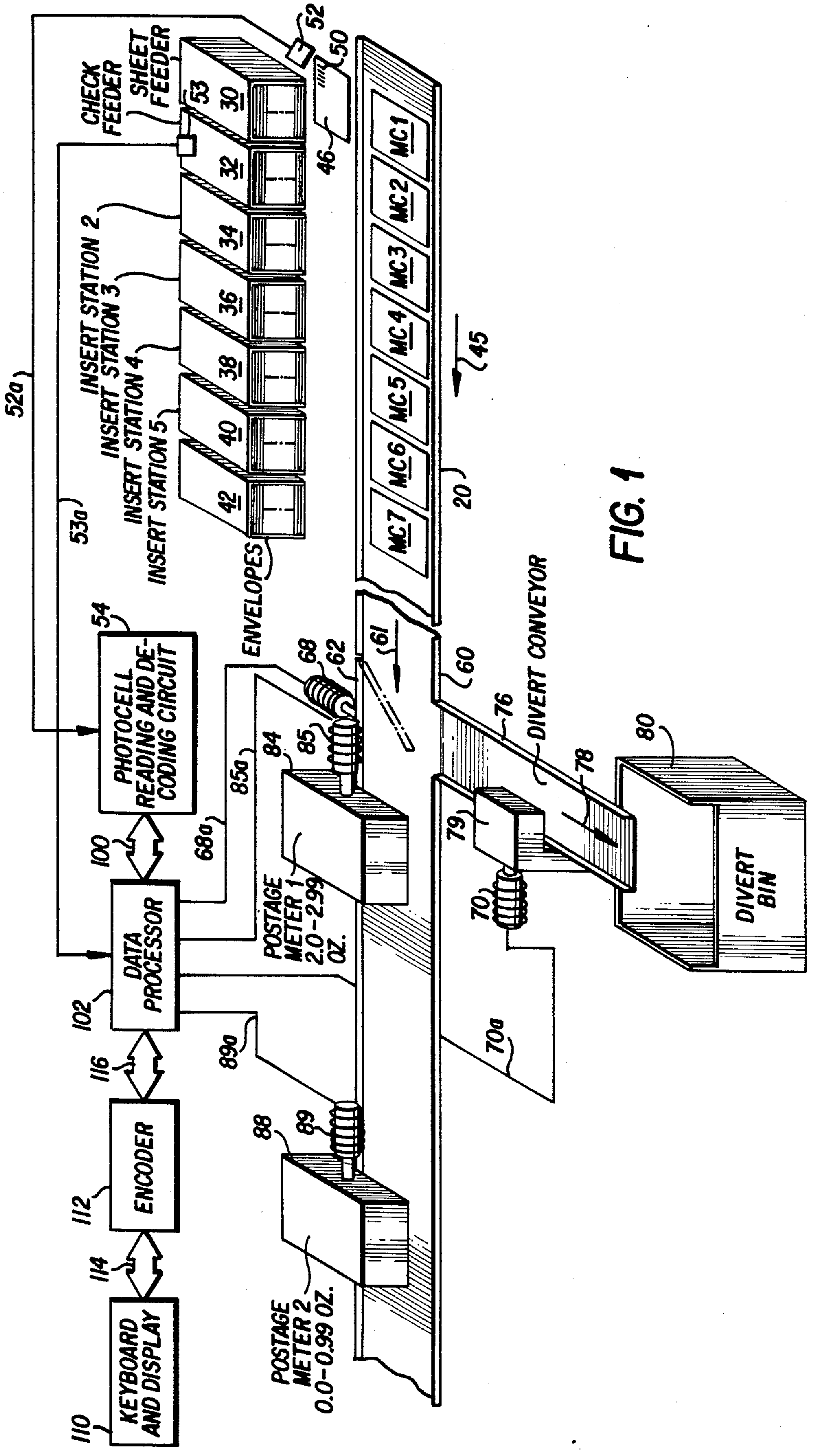
FIG. 1 is a schematic view of an insertion machine according to an embodiment of the invention.

FIG. 1 shows a feed track or conveyor 20 which travels past seven consecutive insertion stations 30, 32, 34, 36, 38, 40 and 42. In the embodiment shown, conveyor 20 is intermittently driven by a chain and sprocket arrangement so that the conveyor travels generally in the direction shown by arrow 45. That is, during successive machine cycles a document on conveyor 20 travels in a leftward direction so that during the second machine cycle (MC2) the document is proximate the station 32; in the third machine cycle (MC3) the document is proximate the station 34, and so forth.

The first station (station 30) is a sheet feeder (SF) station from which are fed one or more documents (also referred to as "sheets") for a plurality of customers. In one mode the document fed from station 30 functions as a control document which to some extent governs downstream operations as seen hereinafter. In a simplified mode the document fed from station 30 does not govern downstream operations. FIG. 1 shows a control document 46 in the process of being fed from the sheet feeder station 30 and being deposited on conveyor 20 during the first machine cycle (MC1).

The second document feeding station 32 comprises means for feeding one or more documents therefrom onto document 46 when document 46 is in a position on the conveyor 20 shown as MC2. In the embodiment shown in FIG. 1 (which concerns a bank statement system), the feeding means comprises a check feeder 32 capable of rapidly feeding a plurality of checks (such as cancelled checks) associated with the customer whose control document 46 was deposited onto the conveyor during MC1.

In a simplified mode of the invention the number of documents fed from the feeding station 32 is constant for each customer and hence need not be specially discerned with respect to each customer. In another mode the documents fed from sheet feeder 30 function as control documents which govern the number of documents which are fed from the fast feeder 32. In the later regard, the number of documents (in this illustration, cancelled checks) fed from the fast feeder of station 32 is determined by indicia borne in a field 50 on the control document 46. The marks in field 50 comprise control and count indicia which are read in conventional manner by photocell reading means 52 positioned in proximity to station 30. Photocell reading means 52 is electrically connected by connector 52a to a photocell reading and decoding circuit 54. In the embodiment shown in FIG. 1, the photocell reading means 52 is operative with the circuit 54 to function as a conventional reflective-type reading system particularly adapted to read a bar code. The circuit 54 is adapted to interpret the bar code in indicia field 50 and to appropriately express and transmit the interpreted data via a data bus to data processing means.

In the described embodiment wherein a plurality of bank checks are fed from the fast feeder of station 32, it is to be noted that some checks used in commercial transactions are relatively long (such as business checks) while others are relatively short (such as personal checks). To this end, a check length sensor 53 is mounted proximate the fast feeder of station 32 for determining whether a check fed from the station 32 is a short check or a long check. The sensor 53 preferably comprises a conventional photocell which is connected by a suitable electrical connector 53*a* to the data processing means hereinafter described. The particular location of the sensor 53 depends on whether the check feeder of station 32 feeds from the top of its associated hopper or from the bottom thereof.

As mentioned above, in one embodiment the indicia field 50 borne by the master document 46 indicates from which of the subsequent stations documents are to be fed during a corresponding machine cycle. If appropriate inserts are selectively fed from the second insert station 34 during the third machine cycle MC3, from the third insert station 36 during the machine cycle MC4, and so forth. Alternatively, in a simplified mode the insertion machine can be set up so that one insert is automatically fed from each insertion station 34, 36, 38 and 40 for each customer.

Each of the stations 34, 36, 38, and 40 comprises suitable gripper means (not shown) for retrieving from the bottom of the stack in the hopper of the station during a corresponding machine cycle the one or more documents associated with a given customer. In this regard, the means for removing documents from the hopper of these stations is, in one embodiment, that disclosed in U.S. Pat. No. 2,325,455 to Williams (incorporated herein by reference), although it should be understood that other types of means for extracting documents from these stations and for depositing the same on conveyor 20 may be employed.

A downstream portion 60 of the conveyor 20 generally travels in the direction of arrow 61 (which is essentially parallel to the direction of arrow 45). Although not specifically shown in FIG. 1, it should be understood that in accordance with differing embodiments numerous other stations are proximate the conveyor and upstream from portion 60 thereof. Examples of unillustrated intermediate stations include a sealing station (where a selectively operable sealing actuator seals envelopes), and one or more vertical stacking stations such as an error stacker station of a type which comprises stacking fingers to grasp documents and hold the grasped documents above the conveyor 20.

The downstream portion 60 of conveyor 20 comprises diversion means 62 which is selectively activated by solenoid valve 68 for pivotal movement into the path of conveyor 60. In this respect, when solenoid 68 actuates diversion gate 62 a stuffed envelope traveling on conveyor 20 is directed by diversion gate 62 (shown actuated in broken lines) off the conveyor 20 and toward "divert" conveyor 76. Conveyor 76 is shown at a position opposite diversion gate 62 and extends essentially orthogonally from the conveyor 20 in order to give envelopes deflected thereto a direction of travel indicated by arrow 78. Certain envelopes which are deflected onto conveyor 76 are first marked at a marking station 79 with an indicia, such as red ink, to indicate that they are overweight. Marking station 79 is selectively actuated by solenoid 70. All the envelopes travelling on conveyor 76 are dumped into a suitable storage location, such as bin 80. For purposes of illustration, stuffed envelopes weighing 3.00 ounces or more are classified as "overweight" and are both diverted onto conveyor 76 and marked. Stuffed envelopes weighing between 1.00 ounce and 1.99 ounces are diverted onto conveyor 76 but are not marked.

A first postage meter 84 is positioned proximate the conveyor portion 60 in essentially in-line fashion for selectively applying an appropriate amount of postage to certain ones of stuffed envelopes travelling down the conveyor portion 60. In the illustrated embodiment, the first postage meter 84 is preset to apply appropriate postage to a stuffed envelope weighing in the range from 2.00 ounces to 2.99 ounces. The first postage meter 84 is activated by a solenoid 85 to apply postage to a stuffed envelope travelling proximate thereto on conveyor portion 60.

A second postage meter 88 is positioned proximate the conveyor portion 60, also in essentially in-line fashion but downstream from the first postage meter 84. Postage meter 88 selectively applies an appropriate amount of postage to certain others of stuffed envelopes travelling down the conveyor portion 60. In the illustrated embodiment, the second postage meter 88 is preset to apply postage to a stuffed envelope weighing in the range from 0.00 ounce to 0.99 ounce. The second postage meter 88 is activated by a solenoid 89 to apply postage to envelopes passing proximate thereby on conveyor portion 60.

From the foregoing it is seen that four weight classifications have been established with respect to the illustrated mode of FIG. 1: an overweight classification (3.00 ounces and greater); a high range classification (2.00 ounces to 2.99 ounces); a mid range classification (1.00 ounce to 1.99 ounce); and, a low range classification (0.00 ounces to 0.99 ounces). Unlike the stuffed overweight envelopes routed down the overweight conveyor 76, the mid range envelopes on conveyor 76 are not physically marked with an indicia, such as red ink as described, so that a basis exists for visually differentiating between envelopes of the two classifications.

It is to be understood that further processing, such as zip code sorting, for example, takes place in unillustrated stations yet downstream from conveyor portion 60.

FIG. 1 further shows a keyboard and display panel 110 interfacing with an encoder 112 through a four bit bi-directional data bus 114. Encoder 112 in turn communicates with the data processor 102 through a four bit bi-directional data bus 116.

Figure 3:
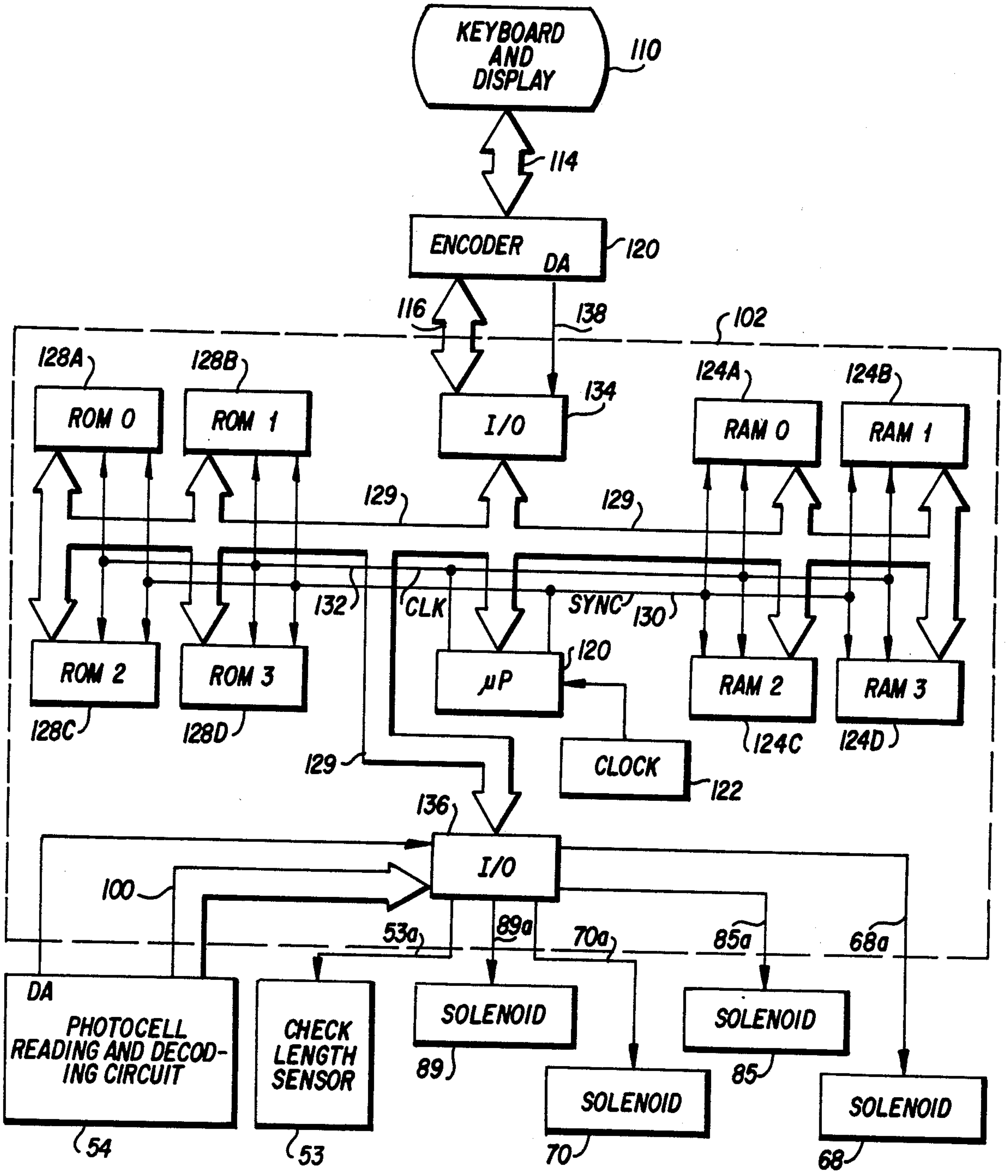
FIG. 3 is a schematic view showing components included in data processing means which comprise an insertion machine according to an embodiment of the invention.

The data processing means 102 is shown in FIG. 3 as comprising a microprocessor 120; a clock 122 used by the microprocessor 120 for timing purposes; four RAM chips 124A, 124B, 124C, and 124D; and, four ROM chips 128A, 128B, 128C, and 128D. A four bit bi-directional data bus 129 connects data pins of the microprocessor 120 to data pins of each of the RAMs 124 and to data pins of each of the RAMs 128. Lines for the RAM bank select signals and ROM bank select signals are not expressly shown inasmuch as their usage will be apparent to those skilled in the art. Line 130 carries a synchronization signal generated by the microprocessor 120 and sent to the RAM chips 124 and the ROM chips 128. Line 132 carries clock signals in a conventional manner. Input/output chips 134 and 136 are also connected to the microprocessor chip 120 through the data bus 129. I/O chip 134 interfaces with the encoder through bus 116 and data available line 138; I/O chip 136 interfaces with the photocell reading and decoding circuit (through bus 100 and data available line 139); the check length sensor 53 (through line 53*a*); and, the solenoids 68, 85, 70, and 89 (through respective lines 68*a*, 85*a*, 70*a*, and 89*a*).

In the illustrated embodiment, the microprocessor 120 of the data processing means 102 is a single chip, 4-bit parallel MOS central processor known as an INTEL 4040. The characteristics of the illustrated microprocessor 120, RAMs 124, ROMs 128, and I/O devices 134 and 136 are described in a publication entitled *INTEL MCS*-40 *Users Manual,* available from the Intel Corporation of Santa Clara, Calif. The instruction set summary provided at pages 1-19 through 1-33 of the March 1976 Third Edition of the referenced publication is used in connection with the processing routines discussed herein.

Referring now to FIG. 2, the keyboard and display 110 comprises a display console or panel 140 which comprises a keyboard 142; an "ounce display" indicator 144; a "station code" indicator 146; a divert mode switch 147; and, a thumbwheel dial 148. Shown proximate the display panel 140 in an "on" position is an ounce set-up mode switch 150 which is manually actuated to accomplish the purposes hereinafter stated.

Ounce display indicator 144 has a hundredths digit display 154 comprising a first seven-segment LED display and a tenths digit display 156 comprising a second seven-segment LED display. Likewise, the station code indicator 146 has first and second seven-segment displays for a first digit display 158 and a second digit display 160, respectively.

The thumbwheel dial 148 is a conventional thumbwheel dial which, for the purposes of this invention, bears the numerals 0 through 9 on its outer circumferential rim. The selected thumbwheel setting is indicated by a selector mark 162 on the panel 140.

The keyboard 142 comprises three rows of keys 170, each row having four keys therein. The first or uppermost row of keys includes a "ON" key, an "OFF" key, a "SEL" or select key, and a "PGM" or program key. The "OFF" and "SEL" keys also double as keys for the numerals "0" and "1" respectively. Row 2 of the keyboard 142 includes separate keys for each of the four numerals "2", "3", "4", and "5". Row 3, or the lowermost row of the keyboard 142 includes four keys for the numerals "6", "7", "8", and "9". The key labeled "9" is also labeled "E". The keys are appropriately labeled in the just-described format, each key 170 bearing an appropriate indicia thereon. Each key 170 has a translucent central portion 172 which overlays a light source, such as an LED, associated with the key.

The divert mode switch 147 is a manual switch which enables the operator to determine which weight classification of envelopes is to be diverted down the conveyor 76. In the illustrated embodiment, the switch 147 can be manually moved to a first position (as shown) to indicate that stuffed envelopes in the mid range (1.00 ounce to 1.99 ounces) are to be diverted onto conveyor 76. If the switch 147 were moved to its second position (low range), then stuffed envelopes in the low weight range (0.00 ounce to 0.99 ounce) would be diverted onto conveyor 76 with the postage meter 88 being preset to process stuffed envelopes in the mid range.

The operation of various embodiments of the insertion machine of the invention will now be described. The mode of operation under discussion generally concerns the reading of a control document from the sheet feeder station 30 in order to determine the stations from which inserts are to be fed and the number of inserts fed from each. The operation of a simplified mode wherein insert stations automatically feed inserts without governance by read parameters is also understood from the ensuing discussion.

The data processing means 102 executes numerous specialized routines in connection with the overall operation of the entire insertion machine. These numerous routines are, for the most part, called into execution by master routines, including a master routine SYS. These lengthy and complex master routines supervise execution of the specialized routines, many of which are relatively independent rather than interdependent. In this respect, most of the specialized routines called by the master routines concern process steps which do not form a part of the present invention such as, for just one example, the operation and timing of means used to extract inserts from each of the insert stations along the conveyor. For this reason, only the specialized routines pertinent to this invention are discussed herein. The interface between the pertinent specialized routines and the appropriate master routine (SYS) is sufficiently discussed herein without describing all the collateral aspects of the master routine.

Figure 7:
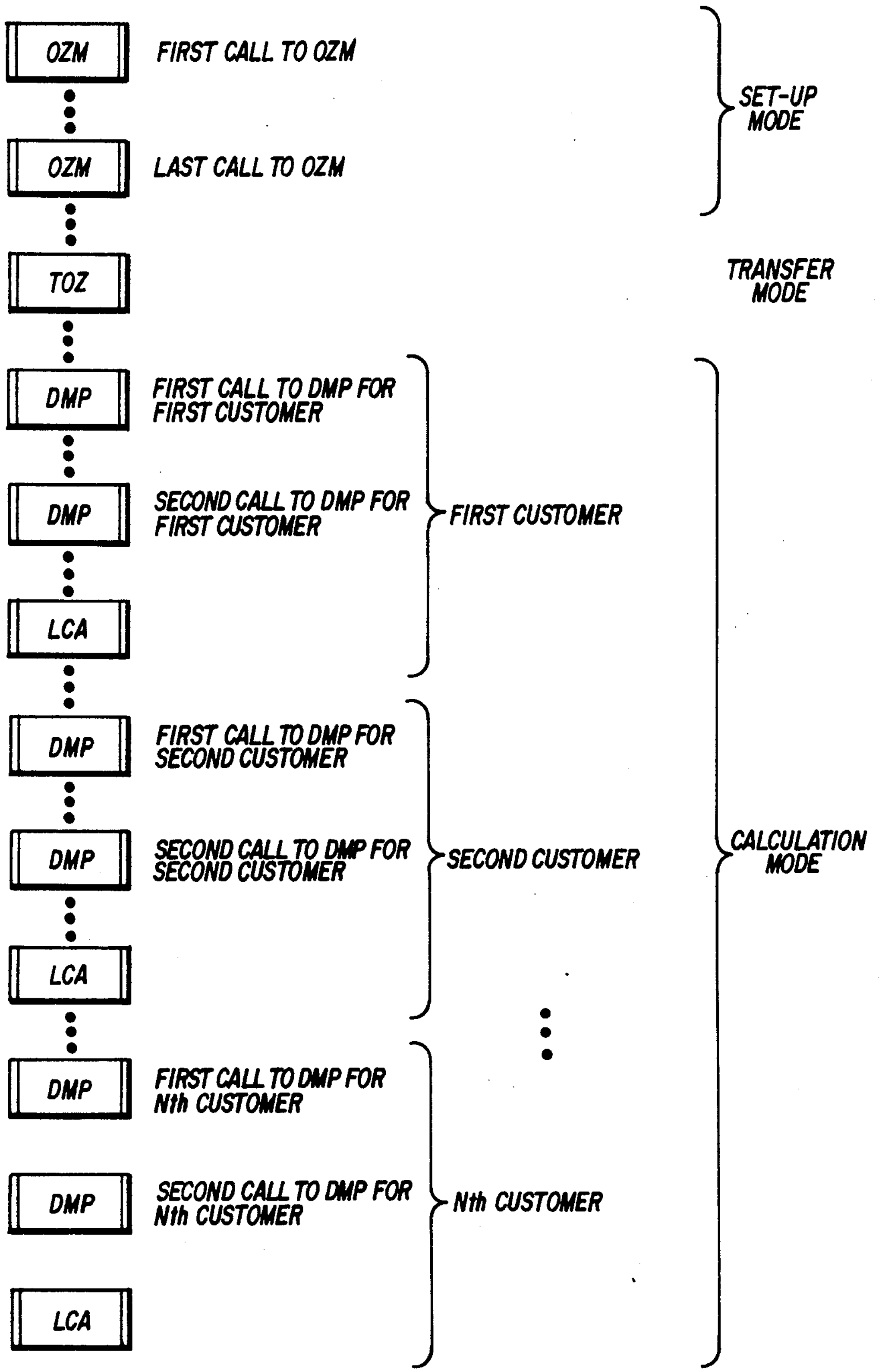
FIG. 7 is a diagram depicting a sequence in which a master routine calls various specialized routines; and, FIG. 8 is a diagram depicting processing steps executed by a specialized routine LCA.

FIG. 7 illustrates the manner in which master routine SYS superintends processing of the various specialized routines which the data processing means 102 finds pertinent to the invention. It is to be understood that the specialized routines shown in FIG. 7 are included at intermediate processing sequence positions between start up and shut down of the insertion machine. The vertical arrangement of three dots between the routine blocks of FIG. 7 indicate that the specialized routines are not necessarily executed one after the other, but that calls to other specialized routines not pertinent to the invention may be interspersed in the sequence.

FIG. 7 shows that the set up mode includes calls to routine OZM. The routine OZM, as hereinafter described, enables the operator to store in memory in the data processing means 102 data pertinent to the per item weight at selected insert stations and to display indications of the same on the panel 140. The routine OZM is called repeatedly until the switch 150 is manipulated to indicate that the set up mode is to be terminated and the PGM key on keyboard 142 is pressed.

Sometime after the last call to routine OZM a call is made to the specialized routine TOZ. Routine TOZ basically transfers certain values at addresses in one memory location to another memory location, and in addition determines the difference between the weight of a long length item and the weight of a short length item fed from the fast feeder 32, putting the tenths digit results and the hundredths digit results in locations FLOTEN and FLOHUN, respectively As further shown in FIG., 7, in the calculation mode the master routine SYS calls specialized routine DMP twice per customer and, if and only if a flag SYSMDE is on, a specialized routine LCA once per customer.

SET-UP MODE

When the operator desires to prepare the insertion machine to process a new batch of documents, such as bank statements, for example, in the manner aforedescribed, the data processor 102 must be supplied with information relative to the per document weight of the documents at each of the stations 30, 32, 34, 36, 38, 40, and 42. As seen hereinafter in connection with the DMP routine and related routines, this information is required in order for the data processor 102 to (1) compute the weight of each envelope (including its associated contents) traveling on the conveyor 20 and to (2) appropriately divert the envelope to conveyor 76, or to activate in timely fashion either the first postage meter 84, the second postage meter 88, or the marker 79.

As seen hereinafter, the necessary per document weight for each insert station is input using a routine OZM which is called by the master routine SYS. To commence the set up procedure, and hence appropriate calls to the OZM routine, an operator must first manipulate the ounce mode set-up switch 150 to be in the "ON" position as shown in FIG. 2. Placing the switch 150 in the "ON" position sets a flag in an OZMDE address location which is checked by the routine SYS to determine whether one of the two criteria have been met for a call to OZM. Additionally, the operator must depress the PGM key on the keyboard 142. Once the switch 150 and the PGM key are activated, the SYS routine essentially remains in a closed loop of repeated calls to the routine OZM until the following two steps both occur: (1) the switch 150 is moved to the "OFF" position, and (2) the PGM key is again depressed.

Figure 5A:
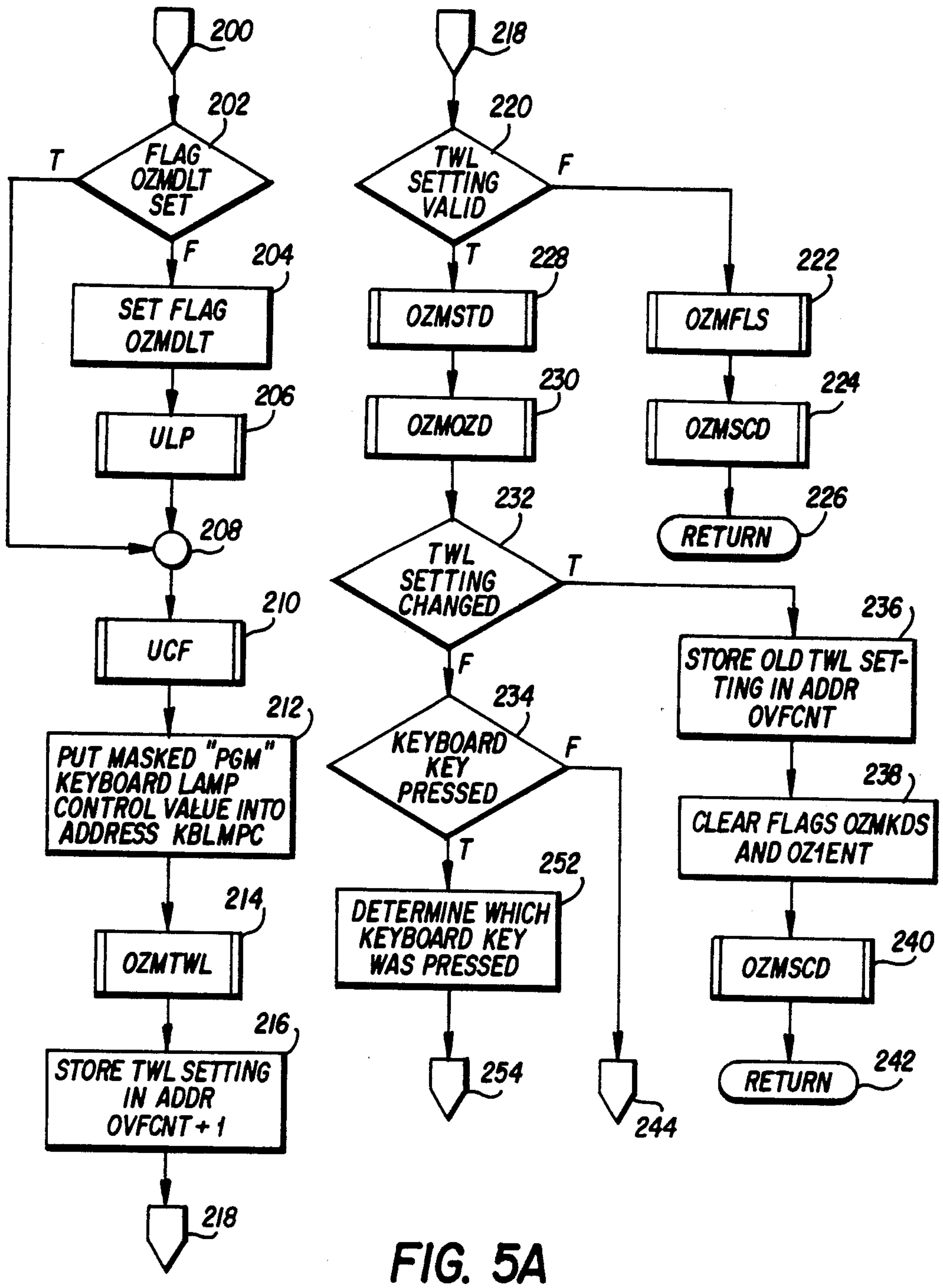

The procedure effected by the routine OZM is diagramed in FIGS. 5A and 5B. A call to OZM transfers control to an instruction at address OZMFLP represented by the symbol 200 in FIG. 5A. The first step 202 performed in routine OZM is a check to determine whether the flag OZMDLT has been set. If the OZMDLT flag has not been previously set, it is so now (in step 204) and a call is made (step 206) to the utility routine ULP. In essence, the routine ULP clears all lights associated with the keys 172 on keyboard 142 inasmuch as some of the keys may have previously been lit. Upon return from the routine ULP the next instruction to be executed is at location OZMPT1 which is represented by symbol 208. If it is determined in step 202 that the OZMDLT flag has already been set, a jump is made to the instruction at location OZMPT1 (represented by symbol 208).

At location OZMPT1 a call is made to utility routine UCF (step 210). Routine UCF essentially prepares a mask that operates on a value in location PGMKLP so that the light associated with the PGM key will flash on and off. A call to the routine UCF basically increments a counter which determines the construction of the mask.

In step 212 the bit PGMKLP (which is indicative of the status of the lamp for the PGM key) is turned on and then masked with the mask returned from the routine UCF. The mask returned from the routine UCF may, depending on its construction (and thus the contents of the counter maintained by routine UCF), either leave the bit PGMKLP unmodified (and thus the lamp stays on) or may modify the bit PGMKLP (setting it equal to zero so that the lamp is turned off). Upon repeated calls to the routine OZM, and hence upon associated repeated calls to the utility routine UCF, the value of the counter in UCF changes so that upon a selected number of repeated calls the mask is altered to cause the value of the bit PGMKLP to essentially flip-flop. The value of the bit PGMKLP is applied on an output address KBLMPC to the keyboard 142 and the flip-flop nature of the contents of the PGMKLP bit causes the PGM key to flash on and off.

During each execution of the OZM routine a call is made to routine OZMTWL as shown in step 214. Execution of the OZMTWL routine causes the value selected on the thumbwheel 148 to be input from a location THUMBT. In step 216 after the return from routine OZMTWL, the value selected by the thumbwheel (hereinafter referred to as of TWL) is stored in an address OVFCNT+1.

Figure 4A:
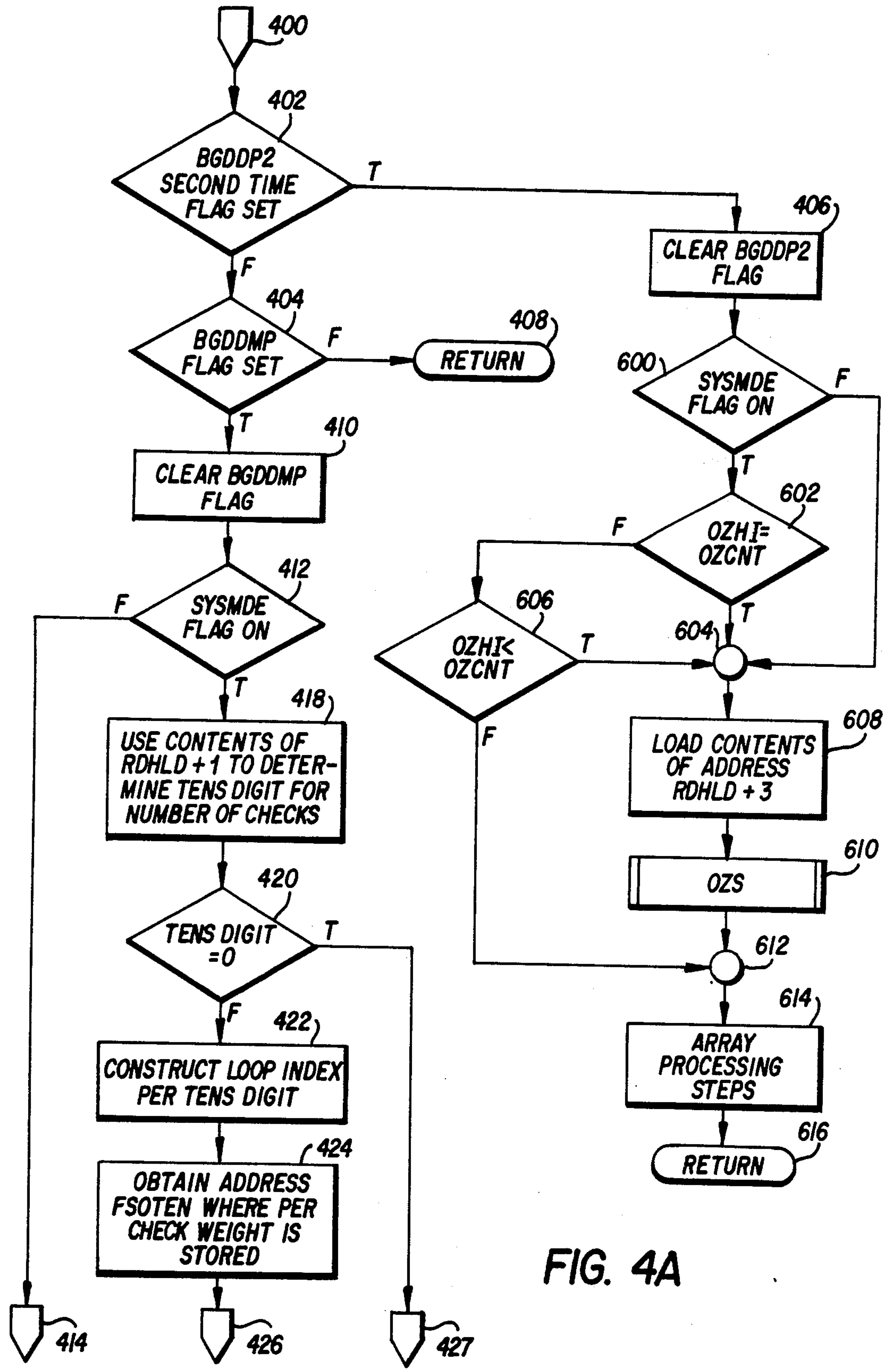
FIGS. 4A, 4B, 4C, 4D, and 4E are diagrams depicting processing steps executed by a specialized routine DMP.
Figure 4B:
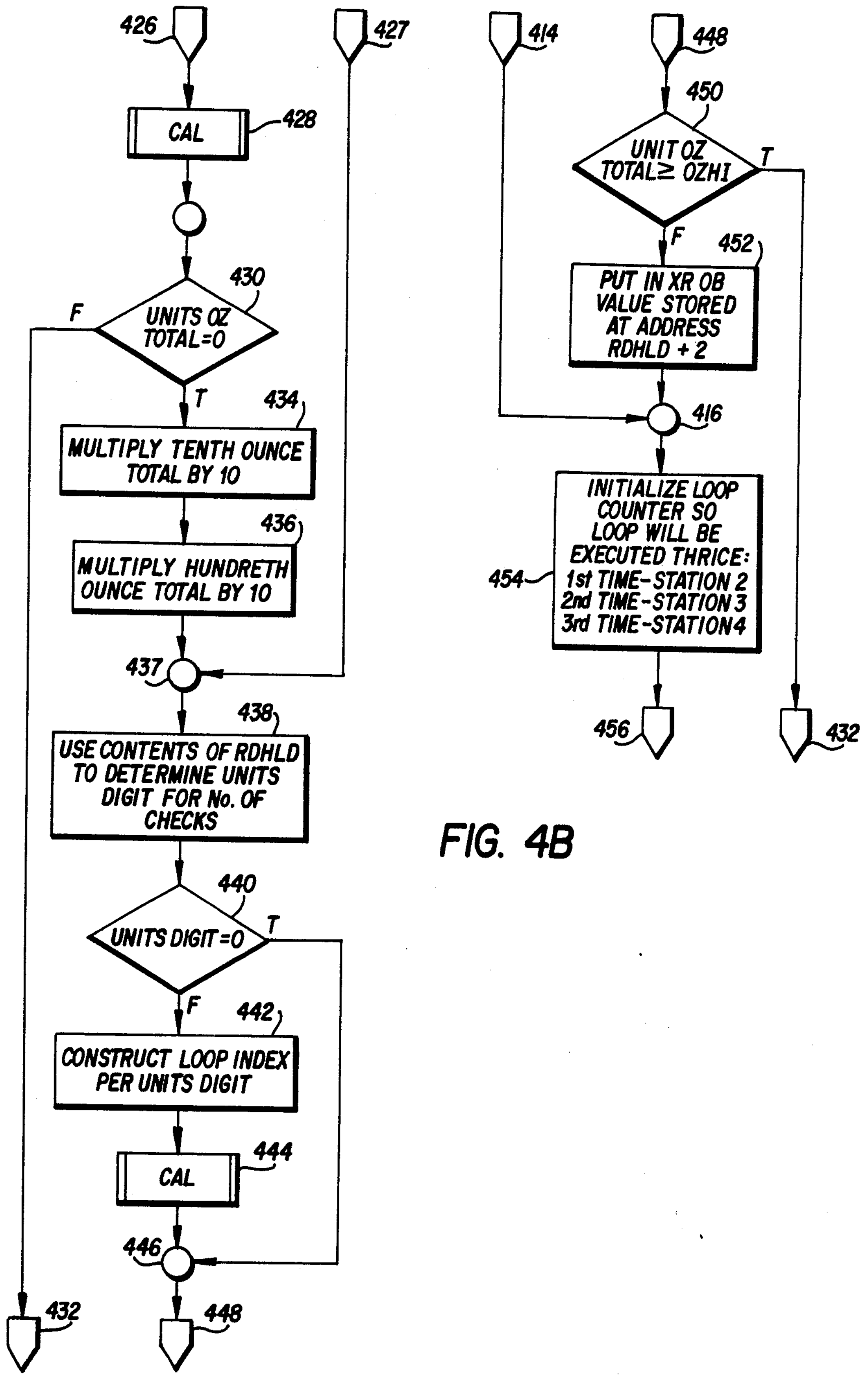
Figure 4C:
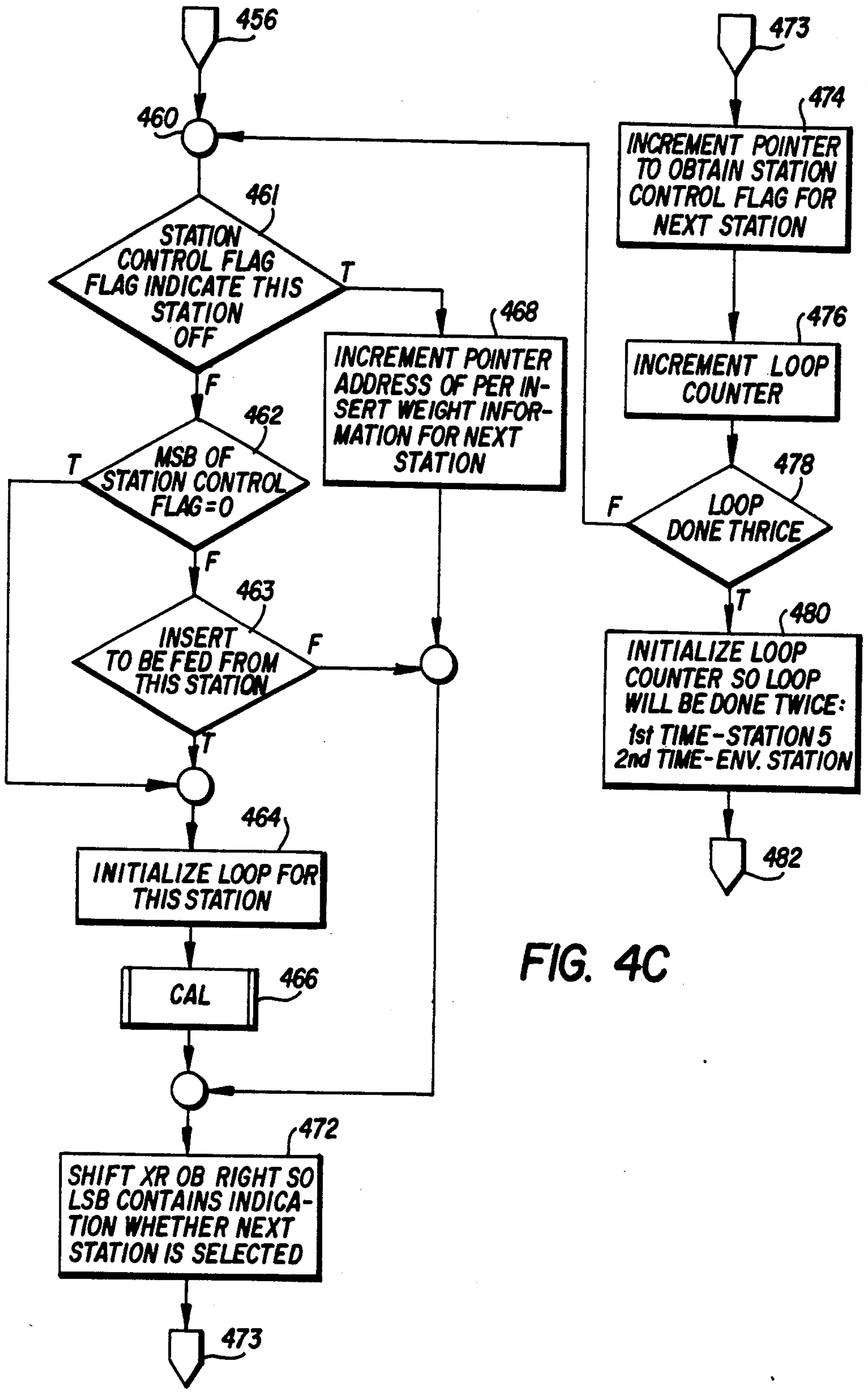
Figure 4D:
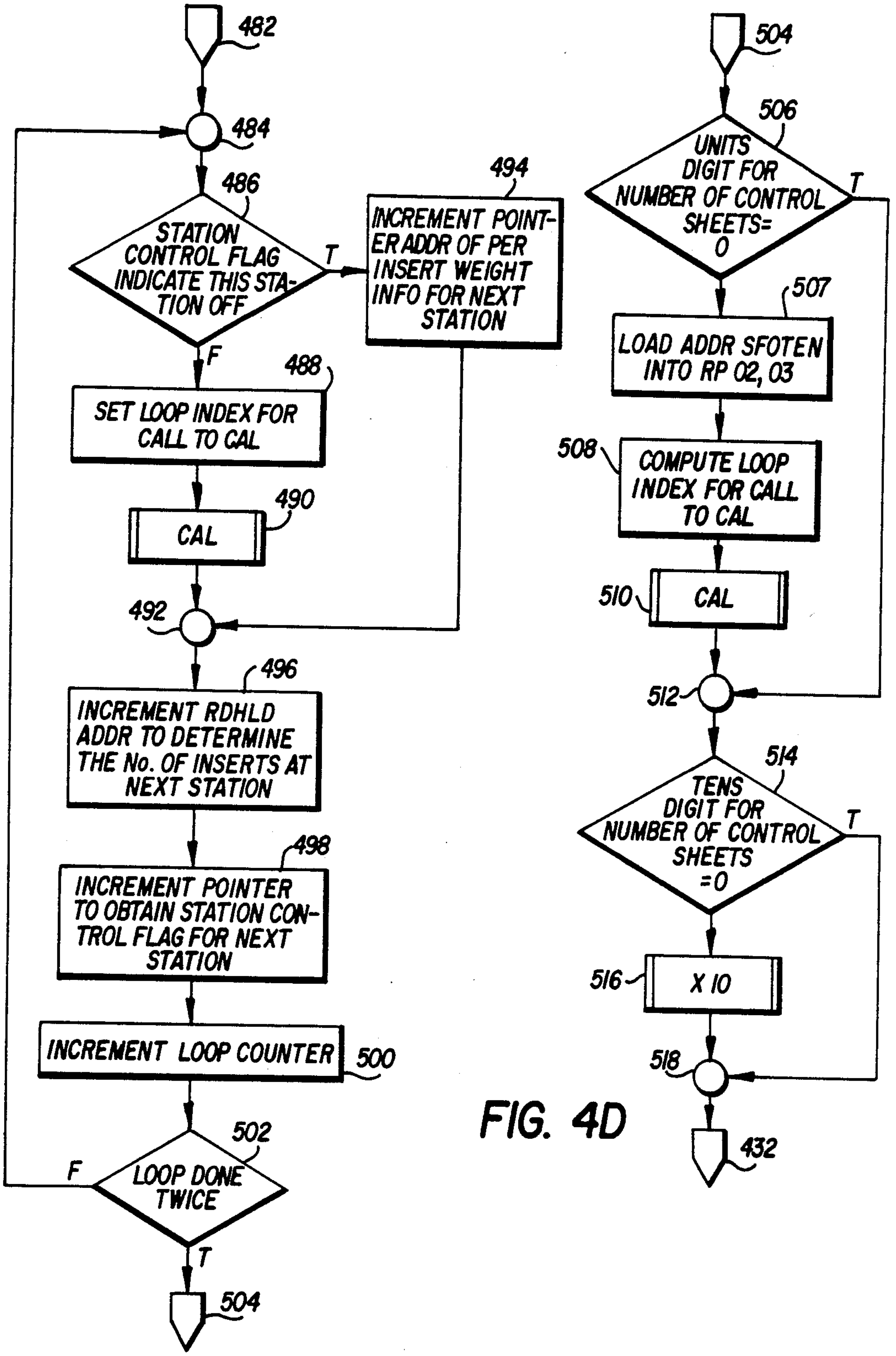
Figures 4E, 6:
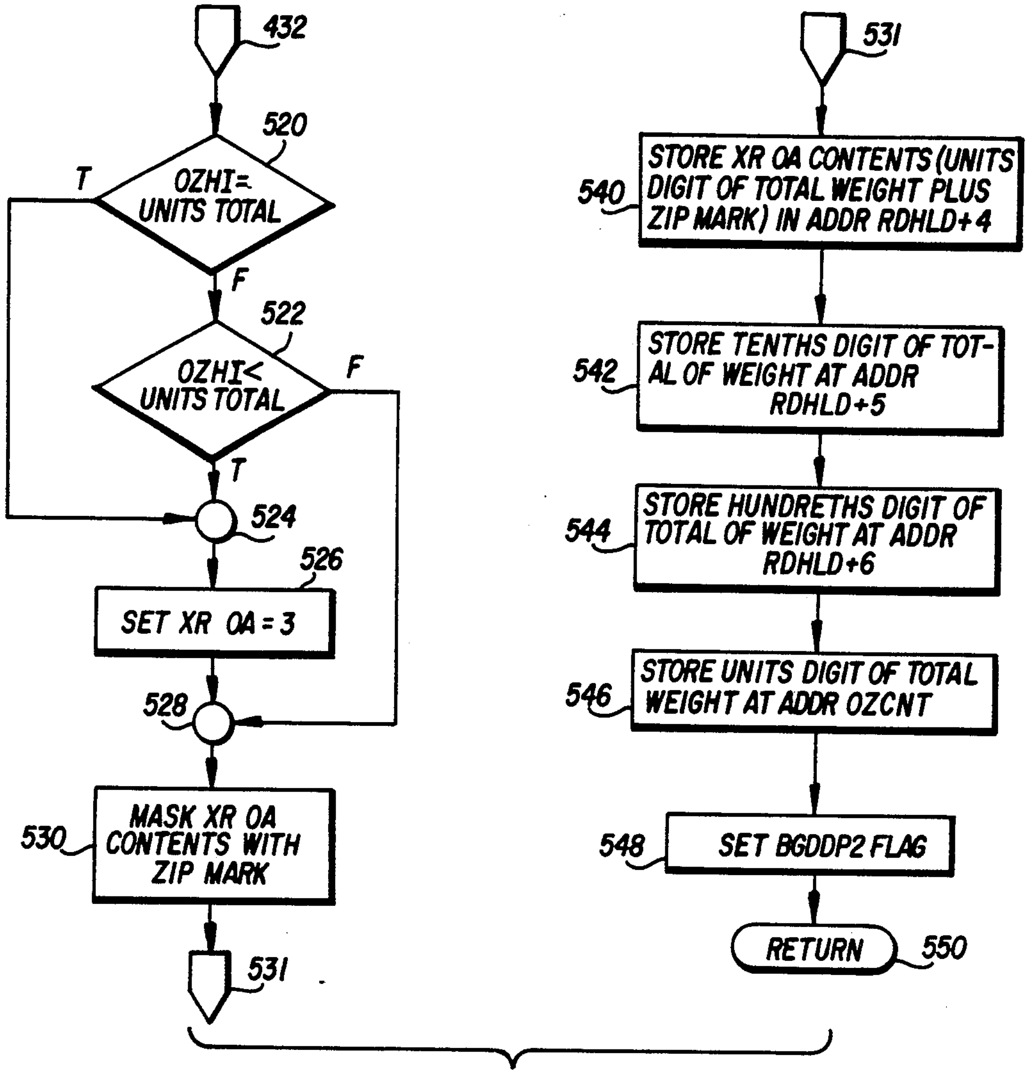
FIG. 6 is a table depicting relationships between inputs and outputs with respect to the keyboard and display panel of FIG. 2.

Once the TWL setting for thumbwheel 148 has been determined, a check is made (step 220) to determine whether the selected value of TWL is valid. That is, a check is made to determine whether the selected value is within an acceptable range. The accepted values include the numerical settings 0, 1, 2, 3, 4, 5, 6, and 7. As indicated by FIG. 6, each of these acceptable settings correspond with one of the stations (stations 30, 32, 34, 36, 38, 40, and 42) shown in FIG. 1. For example, TWL=0 corresponds to station 30. TWL=1 and TWL=2 both concern station 32. As will be seen hereinafter, station 32 is a "dual-length" station in that documents of two lengths can be fed therefrom with respect to each customer. In this regard, a thumbwheel 148 setting TWL=1 corresponds to long length documents (such as relatively long commercial-type checks) while a setting TWL=2 corresponds to short length documents (such as relatively short personal checks). A setting TWL=3 corresponds to station 34, and so forth. Although present on the thumbwheel 148, the numerals "8" and "9" do not correspond to insert stations and hence are invalid thumbwheel entries.

In the event the value of TWL is determined to be invalid, a call is made (step 222) to a routine OZMFLS. The routine OZMFLS essentially makes preparations so that the value "00" will be flashed at the station code indicator 146 on panel 140. In making these preparations, routine OZMFLS makes a first of two calls to routine OZMWDS. Routine OZMFLS passes to the routine OZMWDS on this first call the address S1RDUL and the value "00". Routine OZMWDS operates in a loop to put the value "00" into the address S1RDUL (which corresponds to an encoded value "0" which is to be displayed at the digit 158 of the indicator 146) and also places the value "00" into the location S1RDUL+1 (also referred to as address S1RDUU) so that a corresponding encoded value "0" can be displayed in the digit 160 of the indicator 146. After the first call to routine OZMWDS, the routine OZMFLS calls the routine UCF which, as discussed above, prepares a mask based on a counter. The mask is prepared by routine UCF so that upon the second call to routine OZMWDS from routine OZMFLS the digit displays 158 and 160 of indicator 146 may be turned either on or off. In a similar manner as with step 212 above, successive calls to the routine OZM, and thus the routines OZMFLS and OZMWDS, will cause the display units 158 and 160 to flash in accordance with the incrementation of the counter of routine UCF and the mask developed by routine UCF.

Upon return from the routine OZMFLS, a call is made in step 224 to the routine OZMSCD which clears (turns off) the lamps associated with the keys 172 on the keyboard 142. Upon return from the subroutine OZMSCD, processing returns from the routine OZM to the routine SYS as indicated by the symbol 226. As indicated above, unless both the switch 150 and the key PGM are turned off, the routine SYS will again call the routine OZM. Unless a valid TWL setting has been selected prior to step 220 of the next execution of routine OZM, the steps described above will again be repeated. It should be understood that the repeated execution of routine OZM causes the various lamps associated with the keyboard 142 to flash on and off in the manner described above.

In the event that the TWL setting has been determined to be valid, a routine OZMSTD is called (step 228). Routine OZMSTD functions for this particular call to display in indicator 146 a code (see FIG. 6) which represents the station selected in accordance with the thumbwheel 148 setting. For example, for a setting of "3" on thumbwheel 148, the digit display 160 of the indicator 146 displays the value "S" and the digit display 158 displays the value "2". The composite "S2" code shown on display 146 indicates to the operator that the data processor 102 is now operating in a mode in which the per document weight of the documents at the second insert station 34 can be programmed. FIG. 6 indicates the other possible station display codes which can selectively appear at indicator 146 depending on the various corresponding settings of the thumbwheel 148. The operator, seeing the display code displayed in indicator 146, has the option as discussed hereinafter to either re-program the per document weight for the display station or manipulate the thumbwheel 148 to input data relative to another station.

After the call to routine OZMSTD, the routine OZM calls a routine OZMOZD (step 230) in order to display on display indicator 144 the current per document weight information associated with the station whose code is being displayed in indicator 146. The routine OZMOZD calls a routine OZMATD which fetches from an address contained in Register Pair 0 (hereinafter Register Pair is abbreviated RP) a value which is put into RP 4. In this respect, routine OZMATD constructs the address placed into RP 0 essentially by adding the value TWL (stored in location OVFCNT+1) to the address of the first word SFOZTN of a table at location OZMATL. In this respect, the word SFOZTN is an address wherein is stored a value indicative of the tenths digit of the per document weight for the "SF" station (the sheet feeder station 30). Successive words in the table OZMATL generally correspond to address locations for tenths values for successive stations. For the purposes of table OZMATL, however, the insertion machine is conceptualized as having eight rather than seven stations as shown in FIG. 1. This conceptualization results from the fact that the check feeder station 32 can feed either long checks or short checks for a particular mode, long and short checks not necessarily having the same weight. Hence, the table OZMATL is constructed to have the addresses of the following eight words:

Word 0—SFOZTN
Word 1—FLOZTN
Word 2—FSOZTN
Word 3—S2OZTN
Word 4—S3OZTN
Word 5—S4OZTN
Word 6—S5ZTN
Word 7—ENOZTN Thus, for the setting "3" on the thumbwheel 148, routine OZMATD constructs the address S2OZTN. Routine OZMATD further fetches data at the address S2OZTN and puts the same into RP 4,5 before returning to the routine OZMOZD.

Upon the return from routine OZMATD, the routine OZMOZD puts the current tenths ounce value into index register (hereinafter abbreviated as "XR") 8 and computes the address from which the current hundredths ounce value can be fetched for the currently selected station. In this respect, the address at which a hundredths ounce value for a particular station is stored is just one word greater than the address at which the tenths value was stored for the same station. With reference to the second insert station 34, for example, in order to obtain the hundredths value for station 34 the routine OZMOZD determines that the appropriate value is located at the address S20ZTN+1=S20ZHU. The routine OZMOZD fetches the value at address S20ZHU and puts the same in XR 9. Then, having put the value at address S20ZTN into XR 8 and the value at address S20ZHU into XR 9, the routine OZMOZD calls the readout display routine OZMROD.

Routine OZMROD displays on indicator 144 the contents of the addresses which represent tenths ounce and hundredths ounce information for the currently selected station. To do this routine OZMROD converts the value at the address corresponding to each ounce digit into a two word code, putting the first word of the two word code into an output address S1RDUL and the second word of the two word code into output address S1RDUU. In this respect, it should be understood that the two word code formulated by the routine OZMROD is a code which is utilized by the data processor 102 so that a meaningful number can be displayed on the indicator 144.

Once the per document weight information has been displayed at indicator 144 for the currently selected station as shown at indicator 146, the routine OZM determines whether the setting TWL of the thumbwheel 148 is the same for the current execution of routine OZM as it was during the next previous execution. In particular, at step 232 the routine OZM determines whether the value stored in location OVFCNT+1 (the current TWL setting) is the same as that already stored in location OVFCNT (the setting of the thumbwheel 148 during the next previous execution of the routine OZM). Unless the operator has changed the setting of thumbwheel 148 since the last execution of the routine OZM, the values in locations OVFCNT+1 and OVFCNT will be equal and the routine OZM will execute step 234 as described later herein.

Suppose, for example, the display 146 had read "SF" on the next previous execution of the routine OZM in connection with the setting up of data for the sheet feeder station 32 but has just been changed to "S2" by the operator's manual selection of thumbwheel 148. The value stored in OVFCNT is "0"; the value stored in OVFCNT+1 is "3" assuming TWL setting 3 for insert station 34 has just been selected. When the operator changed the setting on thumbwheel 148 in order to input new per document weight data for a station other than the one currently shown at station code indicator 146, the routine OZM executed step 236 to store the old TWL value into the address OVFCNT. Storage of the former TWL value is required so that the determination of step 232 can be made during the subsequent execution of the routine OZM.

In addition to storing the old TWL value when a new TWL setting has been selected on the thumbwheel 148, the routine OZM executes step 238 to clear the flags OZMKDS and OZ1ENT. Having cleared these flags, routine OZM calls the routine OZMSCD (step 240), which at this point clears appropriate addresses so that any keys previously lit on the keyboard 142 are turned off.

Following the execution of steps 236, 238, 240 described above, processing returns from the routine OZM to the routine SYS as indicated by the symbol 242. However, as mentioned before, unless the switch 150 is turned to the "OFF" position and the key PGM again depressed, the routine SYS immediately recalls the routine OZM. During this recall of OZM, the new TWL value is put into the address OVFCNT+1 at step 216 following the call at step 214 to routine OZMTWL. Also during this call to routine OZM, should the new TWL setting be valid the routine OZMSTD (step 228)

causes the newly selected station code to be displayed at indicator 146. The routine OZMOZD (step 230) causes the currently programmed ounce weight information associated with the newly selected station to be displayed at indicator 144. At this point the routine OZM performs the check of step 232 and, assuming the value of TWL has not again been changed, determines that the thumbwheel setting TWL has not been changed since the last execution of routine OZM. If such a determination is made, the routine OZM branches to step 234.

At step 234 the routine OZM inquires whether new data is available from the keyboard 142. In this respect, the encoder 112 has a pin DA which is false if data is not available from the keyboard 142 but which is true if data is available. Based on this signal from the encoder 112, the data processor 102 sets an input flag DATAVL if data is available. The routine OZM expects data from the keyboard 142 at this juncture inasmuch the next regular mode of operation would be to select keys representing new information for the per document ounce weight for the station code currently displayed at indicator 146. If a key 170 on keyboard 142 has not been depressed, the routine OZM branches to location OZMT7 represented by symbol 246. Further, since a key 170 has not been pressed and since the flag OZMKDS has not been set after being cleared in step 238, the routine OZM notes at step 248 that the flag OZMKDS has not been set and returns processing to the routine SYS as indicated by symbol 250. Given the speed with which the routines are executed and the operator's relative slowness in selecting a key 170 on the keyboard 142, it can be expected that numerous calls to the routine OZM are made before a new key 170 is selected.

Once a key 170 on the keyboard 142 has been selected, however, and the routine OZM notes that fact in step 234 by perceiving that the input DATAVL has been set, the routine OZM executes step 252 to determine which key on the keyboard 142 was depressed. In this respect, data representative of the depressed key is acquired through input address KBDLOW. Inasmuch as two of the keys on the keyboard 142 do not correspond to numerical inputs—the ON key and the PGM key—it would not ordinarily be expected that they would be depressed at this juncture. In this regard, the routine OZM checks the value of KBDLOW at step 256 to determine whether the PGM key was depressed. If the PGM key was not depressed, routine OZM further checks at step 258 to determine whether the ON key was improperly pressed. If neither the PGM key or the ON key were depressed, the routine OZM sets a flag OZMKDS (step 260) to indicate that a valid key on the keyboard 142 was pressed.

Considering briefly the possibility that the PGM key may have been pressed by the operator, in such case the routine OZM branches to a step 262 where it clears both the OZMKDS and the OZ1ENT flags. Then, at location OZMTX (represented by symbol 264), the routine OZMSCD is called (step 266). At this juncture the routine OZMSCD functions to turn off any of the lamps associated with the keys on the keyboard 142. After the call to routine OZMSCD, the routine OZM returns processing to the routine SYS as represented by symbol 268.

When a valid key has been pressed on the keyboard 142 the flag OZMKDS is set as described in step 260 above. Following the setting of the OZMKDS flag, a call is made (step 270) to routine OZMKED. Routine OZMKED basically functions to extinguish all the lamps associated with the keyboard 142 except the lamp associated with the PGM key and the lamp associated with the key just depressed. In order to activate a lamp associated with the key just depressed, the routine OZMKED calls a further routine OZMDEL which uses a look-up table OZMDET to determine an appropriate output address which corresponds to the particular key selected. The selection of the appropriate address in the table OZMDET is based upon the value contained in the address KBDLOW which, as indicated above, is indicative of the particular key pressed.

Upon return from the routine OZMKED, the routine OZM checks (step 248) to determine whether the OZMKDS flag has been set. Assuming a valid key on keyboard 142 was pressed, the OZMKDS flag has in fact been set (see step 260) so that the routine OZM next jumps to step 272 where it inquires whether the flag OZIENT has been previously set. According to specification, the key just depressed represents to the operator the desired tenths ounce digit which the operator expects to see in digit 156 of indicator 144 for the station whose code is displayed in indicator 146. Having already pressed a key for the tenths ounce digit, the next key which the operator will eventually press will represent the desired value for the hundredths ounce digit to be displayed in digit 154 of the indicator 144 with respect to the station whose code is displayed at indicator 146. Thus, for any given station, the first valid key selected on keyboard 142 corresponds to the tenths ounce digit and the second valid key selected corresponds to the hundredths ounce digit. In this respect, the flag OZIENT is used to determine when the key just selected on the keyboard 142 was the first entry (tenths digit) or the second entry (hundredths digit) of an ordered pair of entries for the station selected by the setting of thumbwheel 148.

In the above regard, if the OZIENT flag has not yet been set, the routine OZM calls routine OZM1KD (step 274) which processes the new entry for the tenths ounce digit. In its execution, routine OZM1KD first sets the flag OZIENT so that upon the next execution of routine OZM after step 272 the routine OZM will branch to step 276 to call the routine OZM2KD rather than repeat the call to routine OZM1KD.

After setting the flag OZIENT, the routine OZM1KD calls the routine OZMOKT in order to determine what key on the keyboard 142 was in fact selected. The routine OZMOKT performs a table look-up to determine for eventual display purposes a two word decimal equivalent for the key selected on keyboard 142. In performing the look-up, a table OZTBL is referenced. In this respect, the routine OZMOKD computes an address in the table OZTBL whose contents is the desired two word decimal equivalent. The contents of the selected address of the table is loaded into RP 8.

After having called the routine OZMOKT, the routine OZM1KD calls the routine OZMATD in order to select the proper address into which the converted decimal value in RP 8 is to be loaded. It will be recalled that the proper address is dependent upon the particular station currently selected at the thumbwheel 148. Thus, based upon the TWL code (stored at the location OVFCNT+1) the routine OZMATD computes a value corresponding to an address in its table OZMATL, the computed address having as its contents the address into which the two word decimal conversion equivalent of the most recently selected key is to be stored. Thus, with reference to the table OZTBL of routine OZMOKT and a table OZMATL of the routine OZMATD, if the routine OZM1KD is processing data which indicates that the key for the number "3" was most recently selected on the keyboard 142, the routine OZMATD would store a "3" at the location S20ZTN.

Following a call to routine OZMATD, the routine OZM1KD calls at step 274 a utility routine UDL which essentially serves a a time delay for keeping the lamp associated with the most recently selected key on keyboard 142 lit. After the call to utility routine UDL, routine OZM1KD calls routine OZMSCD to clear (deactivate) all the lamps associated with the keys on keyboard 142. The routine OZMSCD upon its conclusion directs processing from the routine OZM back to the routine SYS as indicated by symbol 278.

Having described how routine OZM1KD (step 274) processes information associated with a newly selected key on keyboard 142, and particularly a key selected to effect the tenths digit 156 in indicator 144 as well the value in a corresponding memory address location, concern now centers on the selection of a second key on the keyboard 142 in order to effect the hundredths ounce digit. In this respect, after the return represented by symbol 278, the routine SYS again calls the routine OZM. Routine OZM eventually checks to see whether another key 170 on the keyboard 142 has been selected. If not, OZM returns processing to the SYS routine as described above. Once a second key associated with the currently selected station has been selected, the routine OZM repeats the steps 256 and 258 to determine whether the selected key is valid, and further sets the flag OZMKDS in accordance with step 260. Further, the routine OZMKED (step 270) is also called.

At this juncture, since a first key of the keyboard 142 has already been selected for the station of interest and since the most recently selected key is the second key of a pair of keys associated with that station, at step 272 the routine OZM determines that the OZIENT flag has already been set (as indeed it was during the previous call to routine OZM1KD (step 274)). Since the OZIENT flag was set, the routine OZM calls routine OZM2KD (step 276) in order to process this second key of the two selected keys, the processing being done in connection with the hundredths ounce digit for the per document weight for the currently selected insert station.

The processing of routine OZM2KD is closely analogous to the processing of OZM1KD but, as described above, concerns the hundredths ounce digit for the selected station rather than the tenths ounce digit. In this respect, like the routine OZM1KD, the routine OZM2KD calls routine OZMOKT to determine which key on the keyboard 142 was actually selected and to determine a two word decimal equivalent of the value represented by the selected key and to put the two word equivalent into RP 8. Further, routine OZM2KD also calls the routine OZMATD which reconstructs the address into which information relative to the tenths ounce digit for the selected station was loaded. This address is returned to the routine OZM2KD in RP 4. However, since the value in RP 8 actually concerns the hundredths ounce value rather than the tenths ounce value, the routine OZM2KD increments the address value in RP 4 so that the numerical value in RP 8 will be loaded into an address indicative of the hundredths ounce value for the selected station. For example, if the second insert station 34 had been selected on the thumbwheel 148, the routine OZMATD would have returned in RP 4 an address corresponding to the location S20ZTN. Routine OZM2KD increments this address by one word so that the address into which the value in RP 4 is loaded is S20ZTN+1=S20ZHU.

Before it completes its processing, the routine OZM2KD clears the OZIENT flag so that upon the next execution of step 272 the routine OZM1KD (step 274) will be called rather than the routine OZM2KD. In a similar manner with routine OZM1KD, the routine OZM2KD lastly calls the delay routine UDL and the routine OZMSCD, after which processing is returned to the routine SYS as indicated by symbol 280.

Although the above description of the set-up mode has been described with reference to only one insert station, particularly the second insert station 34, it should be understood that during the set-up mode any one and more than one stations can have their per document weight values changed. In fact, in commencing a new run or batch through the insertion machine, it is quite likely that per document weights for each of the insertion stations will change. In this event, the operator likely rotates the thumbwheel to a new value, and then keys in on the keyboard 142 a new ordered pair representing the tenths ounce and hundredths ounce per document values for each station.

Once set-up of the insertion machine is complete, the operator need only move the switch 150 into the OFF position and then depress the PGM key on the keyboard 142. As a result of these two manual operations, flags are set by the data processor 102 such that the routine OZM cannot again be successfully called by master routine SYS.

TRANSFER MODE

As seen in FIG. 7, once the set-up mode has been exited (that if, after the return to master routine SYS from the last call to routine OZM), the master routine SYS calls the specialized routine TOZ. Routine TOZ essentially transfers data from certain memory locations to other memory locations. In this regard, but with the exception noted in the following paragraph, the transfers are as follows:

FSOTZN→FSOTEN
SFOZHU→SFOHUN
FLOZTN→FLOTEN
FLOZHU→FLOHUN
FSOZTN→FSOTEN
FSOZHU→FSOHUN
S2OZTN→S2OTEN
S2OZHU→S2OHUN
S3OZHU→S3OTEN
S3OZHU→S3OHUN
S4OZTN→S4OTEN
S4OZHU→S4OHUN
S5OZTN→S5OTEN
S5OZHU→S5OHUN
ENOZTN→ENOTEN
ENOZHU→ENOHUN.

TOZ calls a subroutine TOZSBS which puts into the location FLOTEN a value equal to the difference between the tenths digit weight of a long length item fed from station 32 and a short length item fed from station 32 (the value of FLOZTN less the value of FSOZTN), and into the location FLOHUN a value equal to the difference between the hundredths digit weight of a long length item and a short length item (the value of FLOZHU less the value of FSOZHU).

CALCULATION MODE

Once set-up of the insertion machine has been accomplished using the set-up mode and the transfer mode, and when documents are ready to be fed from the feeder station 30, the insertion machine operation is ready to enter the calculation mode.

As described above, the photocell reading means 52 reads the indicia field 50 on each control document 46 fed from the sheet feeder 30. The electrical signals provided by the photocell reading means 52 are processed and decoded by the circuit 54 in a conventional manner. The circuit 54 determines from the indicia field 50 from which insert stations documents are to be fed and, at least with respect to the sheet feeder station 30 and the check feeder station 32, the number of documents to be fed from each station. Values indicative of such information are supplied on data bus 100 to the data processor 102 which stores the values in appropriate memory locations.

The master routine SYS determines that documents are present at the first station 30 and that the appropriate insert stations along conveyor 45 contain their inserts. Once the routine SYS has processed the mark information read by photocell 52 for a just fed control document 46 and that information has been decoded by circuit 54, routine SYS causes the processed information to be stored in a memory array RDHLD. In particular, prior to a call to routine DMP the first word of array RDHLD (at location RDHLD+0) contains the units digit of the number of checks to be fed from the check feeder of station 32; the location RDHLD+1 contains the tens digit of the number of checks to be fed from the check feeder of station 32. The status of the least significant bit (LSB), also known as the binary 1 bit, of the location RDHLD+2, reflects whether the indicia 50 on the control document indicates that the second insert station 34 is selected for a given customer. The status of the binary 2 bit of the location RDHLD+2 reflects the same for the third insert station 36; the status of the binary 4 bit of the location RDHLD+2 reflects the same for the fourth insert station 38.

Once the array commencing at location RDHLD has been filled, the routine SYS calls the routine DMP, the processing steps of which are indicated in FIGS. 4A–4E. Upon the call to routine DMP, processing jumps to location DMPDP which is represented by symbol 400. With respect to each customer, it is expected that the routine DMP will be executed twice. Processing during the first execution of the routine DMP basically concerns a tenative calculation of the expected weight of the stuffed envelope for the particular customer whose control document 46 was just fed from the feeder 30 onto the conveyor 20. Execution of the routine DMP is done a second time with respect to each customer in order to set appropriate flags which are used in the selective activation of one of the diverter gates 62 and 64 or of one of the postage meters 84 and 88. In this respect, the second execution of the routine DMP for each customer provides a preliminary determination of whether the stuffed envelope will be eventually routed to the first postage meter 84, the second postage meter 88, the overweight bin 80, or the diversion conveyor 90.

In accordance with the foregoing, once it is entered the routine DMP checks to determine whether the flag BGDDP2 has been set (step 402). If the flag BGDDP2 has previously been set, the setting of that flag indicates that this execution of the routine DMP is a second time execution and that rather continuing to process step 404 the routine should jump to process the step 406.

When the routine DMP is being executed for the first time with reference to a particular customer, a determination is made in step 404 whether another flag—the BGDDMP flag—has been set. If the BGDDMP flag has not been set, a return is made to the routine SYS as indicated by the symbol 408. If the BGDDMP flag had been previously set, it is now cleared (step 410).

After clearing the BGDDMP flag in its first execution, the routine DMP then checks to determine whether the SYSMDE flag is on (step 412). The flag SYSMDE is used to distinguish between a simplified automatic mode of operating the insertion machine and another mode wherein master documents 46 are read for the determination of processing downstream along conveyor 20. When the flag SYSMDE is not on, one insert is to be fed from each insertion station rather than a variable number of inserts which is dependent upon a read indicia. When the flag SYSMDE is on, the indicia 50 on control document 46 is read and governs the number of inserts to be fed from at least the sheet feeder station 30 and the check feeder station 32. If the flag SYSMDE is not on, processing jumps to a location DMP1A6 which is presented by symbol 416.

In the event the SYSMDE flag is on, the contents of address RDHLD+1 is checked to determine a partial indication of the number of checks fed from the check feeder 32 (step 418). The contents of location RDHLD+1 is said to be a partial indication of the number of checks inasmuch as the number stored at that location is indicative only of the tens digit of a possible two-digit number representing the number of checks fed from the check feeder 32.

Having obtained an indication from location RDHLD+1 of the tens digit of the number of checks fed, a determination is made whether the tens digit is zero (step 420). In the event that the tens digit is not zero, the routine DMP constructs and places into XR 8 (step 422) a number which, in a forthcoming call to subroutine CAL (step 428), will cause the subroutine CAL to execute an internal loop therein a number of times equal to the tens digit value stored at location RDHLD+1.

Also, prior to the call to CAL in step 428, the routine DMP obtains the address FSOTEN and puts the same in XR 6 (step 424). It will be recalled from the description of the transfer mode that the value contained at address FSOTEN is the tenths ounce representation of the per check weight of the checks fed from the check feeder 32. The hundredths ounce representation is stored in an address FSOTEN+1=FSOHUN.

The routine CAL basically adds new tenth ounce data and hundredth ounce data to running totals of units ounce data, tenths ounce data, and hundredths ounce data. In this respect, upon a call to the routine CAL it is expected that the address containing the tenths ounce information for a selected station has been loaded into the RP 2. Knowing the hundredths ounce information for the station is the next greater address than the address stored in RP 2, routine CAL puts the hundredths ounce data into XR 7 after having put the tenths ounce data into XR 6. The routine CAL adds the tenths ounce data to a running total of tenths ounce data (stored in XR OC). The routine CAL has a loop therein which adds the XR 6 information to the XR OC total, the loop being executed once for each document fed from the check feeder 32. In this respect, the routine CAL knows how many times to execute the loop inasmuch as an index was previously set (step 422) in XR 8. The processing loop and routine CAL further includes steps wherein the hundredths ounce data in XR 7 is added to a running of hundredths data in XR OD, this addition also be executed once per loop. In the course of the loop a check is made to determine whether a carry should be made from the hundredths total in XR OD to the tenths total in XR OC, and whether a carry should be made from the tenths total in XR OC to a units total which is maintained in XR OA.

After the call to routine CAL in step 428, the routine DMP checks to insure that the units ounce total at this point is still zero (step 430), meaning that the number of checks fed from the check feeder 32 is not an exorbitant number which would already be indicative of an overweight envelope. If the units ounce value already exceeds zero, the routine DMP jumps to location DMP1F1 whose location can be traced by connector 432.

If it is not already determined that the envelope will be prematurely overweight, the routine DMP, recalling that the recent execution of routine CAL (step 428) concerned the tenths digit representation for the number of checks read, multiplies the current tenths ounce total in register OC by a factor of 10 (step 434) and multiplies the current hundredths ounce total in register OD by a factor of 10 (step 436). For example, had register OC contained a tenths ounce total "2" and register OD had contained a hundredths ounce total "3", after execution of steps 434 and 436 the units ounce total register OA would contain the value "2" and the tenths ounce total register OC would contain the value "3", register OD (the hundredths total) having been cleared.

At this point it should be remembered that only the tenths digit has been taken into consideration with respect to the number of checks fed from the check feeder 32. That is, if the number of checks fed from the check feeder 32 is 24, after the execution of steps 434 and 436 the weight of only 20 checks have been taken into consideration. Accordingly, routine DMP now checks the contents of location RDHLD+0 (step 438) to acquire the units digit for the number of checks fed from the check feeder 32. A check is then performed (step 440) to determine whether the units digit is zero. If the units digit is in fact zero, the routine DMP jumps to an instruction at a location represented by symbol 446. If the units digit is not zero, an appropriate value is placed into XR 8 (step 442) to function as an index for an immediately following call to the routine CAL (step 444). In much the same fashion as the call to CAL at step 428, the call at step 444 returns the units total in register OA, the tenths total in register OC, and the hundredths total in register OD.

It will be recalled from the discussion of the downstream conveyor portion 60 of FIG. 1 that four distinct weight classifications had been established with respect to stuffed envelopes being processed by the insertion machine: an overweight classification (3.00 ounces and greater); a high range classification (2.00 ounces to 2.99 ounces); a mid range classification (1.00 ounces to 1.99 ounces); and, a low range classification (0.00 ounces to 0.99 ounces). The endpoints of each of these ranges are determined by values stored in the memory portions of the data processor 102. In particular, the following three values specify the classification range endpoints: OZHI, OZMID, and OZLOW. For the classification scheme depicted in FIG. 1, OZHI is set at "3"; OZMID is set at "2", and OZLOW is set at "1". The values of OZHI, OZMID, and OZLOW are selectively changeable as desired by conventional programming techniques.

In step 450 the routine DMP checks to determine whether the unit ounce total in register OA equals or is greater than the value OZHI. Step 450 is executed after step 444 or, if the condition check in step 440 was true, after step 440. Execution of step 450 provides an indication of whether the projected weight of the envelope is already so great that it will be overweight. In such case DMP jumps to an instruction at step 520.

If the value in register OA is less than the value OZHI, the contents of address RDHLD+2 is obtained for subsequent processing (step 452). The LSB of the address RDHLD+2 contains, in one mode of operation, an indication of whether inserts are to be fed at the second insert station 34. Then, the routine DMP inputs a value in register 9 which functions as a loop counter for an upcoming loop (step 454). In this respect, the value loaded into register 9 is "−3", meaning that the upcoming loop will be executed three times. The first execution of the upcoming loop concerns the second insert station 34; the second execution of the upcoming loop concerns the third insert station 36; and, the third execution of the loop concerns the fourth insert station 38.

The loop referred to above commences at location DMP1A which is presented by symbol 460. The steps 461 and 462 in the loop involve checks to determine the status of a station control flag for the particular station of concern during a corresponding execution of the loop. For example, the first time the loop is executed a flag at location STACN2 is examined with reference to the second insertion station 34. During a second execution of the loop a comparable check is made regarding the flag at location STACN3 (which is location STACN2+1) for the insertion station 36, and so forth.

With respect to step 461, and using the first execution of the loop commencing at location DMP1A as an example, the value at location STACN2 is checked to determine whether it is zero. If the value at STACN2 is zero, then the second insert station 34 is turned off (not utilized) and no computations need be made with respect to this station.

With respect to step 462, which is executed only if the corresponding station control flag (for the first loop execution, STACN2) is non-zero, a check is made to determine if the most significant bit (MSB) of the control flag has been set (i.e., is non-zero). If the MSB of the control flag has not been set, then it is recognized that the inserter machine is operating in a mode wherein the corresponding station is to automatically feed one document per customer. If the MSB of the station control flag has been set, then the inserter machine is operating in a mode wherein feeding of an insert from the particular station is not automatic but rather dependent upon the read indicia on a control document 46 as provided by data in the RDHLD array.

With respect to step 463, which is executed only if the corresponding station control flag is non-zero and the MSB of the station control flag is set, the value at the appropriate RDHLD location is checked. For example, the value at the LSB of location RDHLD+2 is checked for the second insert station 34 during the first execution of the loop. If the appropriate bit (LSB) of the RDHLD+2 location is zero, then it is recognized that although this particular insert station is turned on, an insert is not fed therefrom for this particular customer as determined by the customer's master document 46. If the appropriate bit at the RDHLD+2 location is "1", then it is recognized that, although inserts are not being fed automatically from the insert stations that are turned on, an insert is to be fed from the particular insert station for the given customer as determined by the customer's master document 46.

If either (1) the MSB of the station control flag is nonzero, or (2) the MSB of the station control flag is zero and the appropriate bit of the RDHLD+2 location is nonzero, then a value is placed in XR 8 (step 464) in preparation for an upcoming call to routine CAL (step 466). The value in XR 8 indicates the number of times in which the internal loop in routine CAL is to be executed. For each of the three executions for the loop commencing at the location DMP1A, the value placed into XR 8 is "−1" inasmuch as the particular batch operation being described as an example involves the feeding of no more than one document from each of the insert stations 34, 36, and 38 for a particular customer.

The call to routine CAL (step 466) adds both a tenth ounce value and a hundredth ounce value to the respective running totals maintained in register OC and register OD as described above. With respect to the second execution of the loop DMP1A (that is, for the second insertion station 34), during the calls to routine CAL the added tenth ounce and added hundredth ounce values are obtained from locations S20TEN and S20TEN+1=S20HUN, respectively.

Had it been determined at step 461 that the control flag for a particular station were zero, then step 468 must be executed in order to compensate for not calling the routine CAL as was done in step 466. Step 468 essentially increments the RP 2 to compensate for a similar incrementation made by the routine CAL in step 466. After the execution of step 468, the routine DMP jumps to the location DMP1B1 which is indicated by symbol 470. Routine DMP also jumps to location DMP1B1 upon a false condition at step 463.

At location DMP1B1 the contents of XR OB is shifted right one bit (step 472). It will be recalled that in the particular loop being executed XR OB contains the value of address RDHLD+2 which is used to determine the number of inserts at a given station. Thus, shifting right XR OB is preparatory to the next execution of the loop commencing at symbol 460 or for execution of further loops downstream. Similarly, in step 474 RP 4 is incremented so that an appropriate address indicating the station control flag for the next station will be indicated therein. Lastly, in step 476 the loop counter in register 9 is incremented. As indicated at step 478, if the loop has not yet been executed three times, execution branches back to location DMP1A (indicated by symbol 460).

Once the loop commencing at location DMP1A (indicated by symbol 460) has been executed three times, the routine DMP puts into XR 9 a value which will serve as a loop index counter for a loop which commences at location DMP1D (indicated by symbol 484). For the described embodiment, a value "−2" is loaded into XR 9 inasmuch as the loop commencing at address DMP1D (symbol 484) is concerned with the processing of the fifth insert station 40 and the envelope station 42. Accordingly, the loop DMP1D is to be executed twice—the first execution for the fifth insert station 40 and the second execution for the envelope station 42. The loop DMP1D (symbol 484) essentially resembles the loop DMP1A (symbol 460). In loop DMP1D, a check is made to determine whether the LSB of the station control flag is "1" (step 486). If the LSB of the station control flag is "1", then the station is determined to be on and appropriate processing steps (steps 488 and 490) are executed to take into consideration the weight of an insert at that station. Otherwise, appropriate compensation is made (step 494) and processing jumps to an instruction at location DMP1E (represented by symbol 492).

Once the loop commencing in location DMP1D (symbol 484) has been executed twice, the data processor 102 has processed data for the check feeder 32, the insert stations 34, 36, 38, and 40, and the envelope station 42. The only station yet unaccounted for is the sheet feeder station 30. Thus, routine DMP turns its attention to sheet feeder station 30 to determine the number of control sheets fed therefrom. Like with the check feeder station 32, a particular number of sheets fed from the feeder 30 is represented by a two digit number. The units digit for the number of control sheets fed is contained in an address AIMCNT. The routine DMP checks the value of the address AIMCNT to determine whether the units digit is zero. If the value is zero the routine jumps to an instruction in address DMP1A3 represented by symbol 512. If the units digit for the number of sheets fed from station 30 is not zero, a loop index based on the digit value is computed and placed into XR 8 (step 508). Immediately thereafter (step 510), the routine CAL is called. The internal loop of routine CAL is executed a number of times corresponding to a value in XR 8 so that the tenths ounce weight per document (a value given in the address SFOTEN in RP 2) and the hundredths ounce weight (given in the address SFOTEN+1=SFOHUN) per document is repetitively added (according to the number of times the loop is executed) to the tenths total register OC and the hundredths total register OD, with carries being conducted to the units total register OA as needed.

Having just processed the units digit for the number of control sheets fed from the sheet feeder 30, the routine DMP must now process the tens digit. In order to do this, the tens digit is fetched from an address AIMCNT+1. If it is determined in step 514 that the tens digit representation of the number of control sheets fed from the sheet feeder 30 is zero, then execution branches around step 516 to the instruction at location DMP1F which is indicated by symbol 518. If the tens digit for the number of control sheets fed from feeder 30 is nonzero, then a call is made to routine X10 in step 516. Routine X10 calls routine CAL which performs in the manner described hereinbefore. Before returning, however, the routine X10 multiplies the values returned from routine CAL by 10. This multiplication is essentially accomplished by an algorithm which includes placing the contents of register OD (formerly the hundredths ounce total) into register OC and the former contents of register OC (formerly the tenths ounce total) into register OA (the units total).

By the time execution reaches the instruction at address DMP1F, processing has been completed with respect to each of the stations along the conveyor 20.

That is, computations have been made with respect to sheet feeder station 30, the check feeder station 32, the second insert station 34, the third insert station 36, the fourth insert station 38, the fifth insert station 40, and the envelope station 42.

Having processed data with respect to each of the stations, the routine DMP determines whether the computed units ounce total (contained in register OA) equals a maximum allowed value OZHI (step 520). If an equivalence is found, execution jumps to the instruction at location DMP1F1 (represented by symbol 524) so that in a subsequent step 526 the contents of register OA is set to "3". If an equivalence is not found, it is next determined whether the units ounce total in register OA exceeds the maximum allowed value in address OZHI. If the value in register OA is found to exceed the value OZHI, execution jumps to the instruction at location DMP1F2 represented by symbol 528. Otherwise, execution passes to the instruction at location DMP1F1 represented by symbol 524 so that step 526 (described above) can be executed. Processing then continues to location DMP1F2 (symbol 528).

At location DMP1F2 (symbol 528) the unit ounce total in XR OA is effectively masked with a word wherein a zip mark bit is or is not set (step 530). The zip mark is later examined in routines unrelated to this invention to determine if the envelopes are to be sorted according to zip code after postage has been applied.

As it nears completion of its first time execution, the routine DMP stores ounce weight information into appropriate locations in the array RDHLD. In particular, at step 540 the contents of XR OA containing the value of the units digit for the total weight of the stuffed envelope and the zip mark is stored in an address RDHLD+4. In step 542 the tenths digit of the total weight for the envelope in register OC is stored at address RDHLD+5. At step 544, the hundredths digit of the total weight of the envelope in register OD is stored at address RDHLD+6. In step 546 OZCNT is equated with the units ounce digit of the total weight.

Upon completion of the first execution of the routine DMP, the flag BGDDP2 is set (at step 548) so that upon the following call to routine DMP it will be realized that a previous call has been made. After setting the flag, processing returns to the routine SYS as indicated by symbol 550.

As mentioned before, routine DMP is called twice for each customer. The processing procedure for the first call having been described above, attention now focuses on the second call to routine DMP in connection with a particular customer.

On a second call to routine DMP it is determined at step 402 that the BGDDP2 flag has been set (as indeed it was at step 548), so control jumps to step 406 where the BGDDP2 flag is cleared. Then, the flag SYSMDE is checked (step 600). If SYSMDE is not on, processing jumps to an instruction at location DMP2B represented by symbol 604 since further calculations and tests need not be conducted with respect to the weight of the stuffed envelope and an output word determinative of the destination can be prepared by routine OZS. If the SYSMDE flag is on, a determination is made at step 602 whether the value OZHI is equal to the calculated tenative units ounce value which has been stored in OZCNT. If equivalency is found, processing branches to the instruction at location DMP2B (symbol 604) since it is apparent that the stuffed envelope will be overweight. In the event equivalency is not found, a test is made at step 606 whether OZCNT is greater than OZHI. If the value OZCNT is greater, the processing also jumps to location DMP2B (symbol 604) since again it is apparent that the stuffed envelope will be overweight. Otherwise, processing jumps to the instruction at location DMP2C (represented by symbol 612).

When it has already been determined through execution of steps 602 or 606 that the stuffed envelope will be overweight, preparations are made for a call to routine OZS which will go ahead and set the LSB and MSB of location RDHLD+3 to indicate that the stuffed envelope is to be marked and diverted onto conveyor 76 and into overweight bin 80. By way of preparation, at step 608 the contents of address RDHLD+3 is obtained. In step 610 the routine OZS is called. The processing of routine OZS is described further herein. For the present it is sufficient to know that, when called from DMP, the routine OZS and its subroutine OZSSB function to set the LSB and MSB of location RDHLD+3 as mentioned above.

Subsequent processing step in the routine DMP (generally indicated as step 614) basically concern the duplication of data in the array beginning at address RDHLD into another array. After the processing steps 614, processing returns to routine SYS as indicated by symbol 616.

Figure 8:
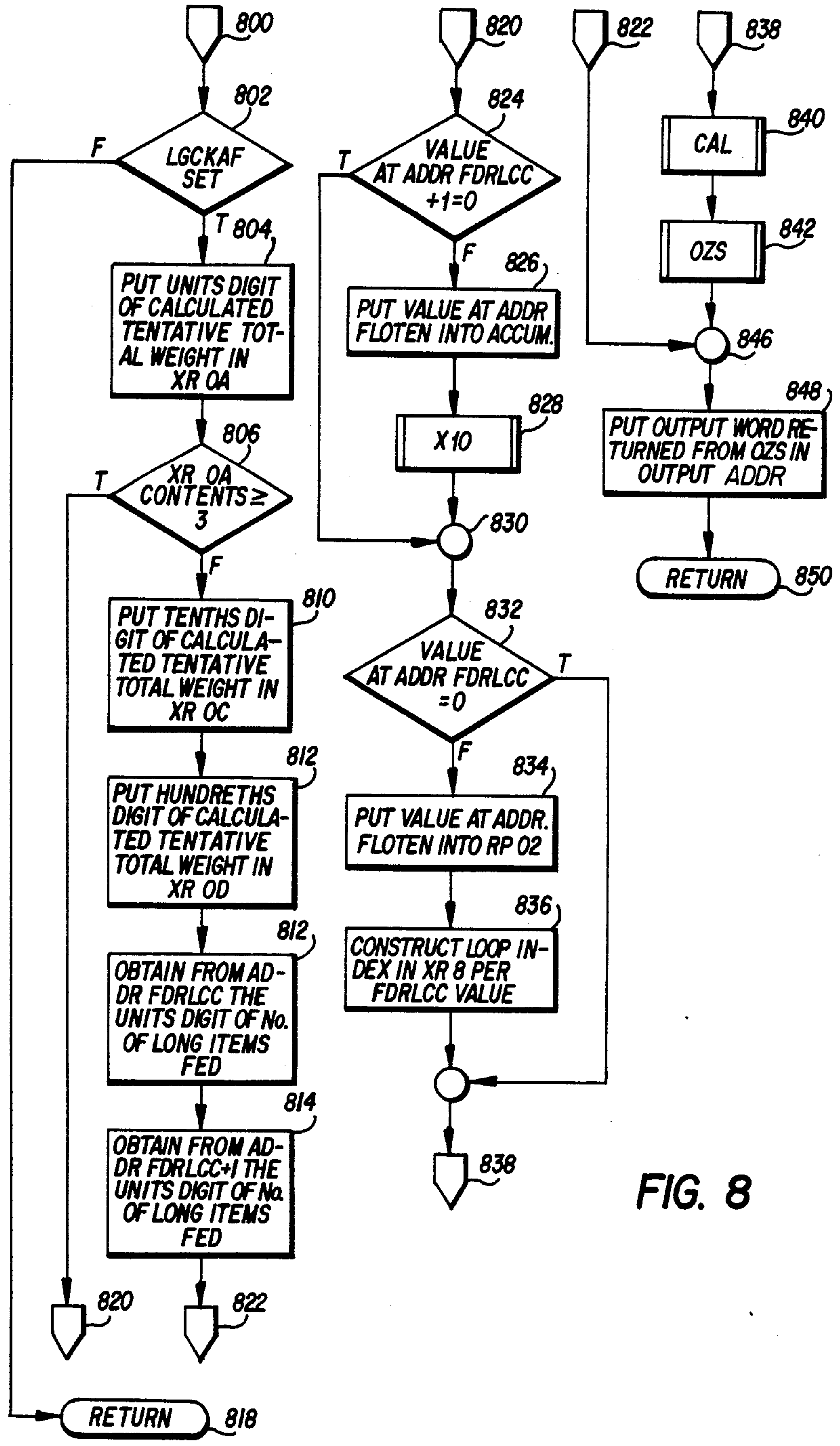

After processing has returned from the second execution of routine DMP (that is, upon the return represented by symbol 616) to the master routine SYS, the master routine SYS calls a routine LCA (also known as the long check add routine) if and only if the SYSMDE flag is on. A diagram of the processing steps of the LCA routine is found in FIG. 8. Basically, the LCA routine (1) modifies the calculated tenative total weight calculation for a customer's stuffed envelope to take into consideration the fact that a certain number of the items fed from the feeder station 32 may have been long length items (since all the items fed from station 32 were considered earlier to be short length items when the tenative calculations were being made), thereby obtaining a calculated final total weight for the customer's stuffed envelope, and (2) calls the OZS routine which, in conjunction with its subroutine OZSSB, sets an appropriate bit in an output word which is used to determine which of the following is to occur: (1) diversion onto conveyor 76 for making at station 79 and for transport into bin 80 (for an overweight envelope); (2) diversion onto conveyor 76 for transport into bin 80 (for a mid range weight envelope); (3) activation of postage meter 84 (for a high range weight envelope); or (4) activation of postage meter 88 (for a low range weight envelope).

Processing for routine LCA begins at location LCARTE (symbol 800), after which a check is made regarding the flag LGCKAF (step 802). If flag LGCKAF is unset, processing returns to routine SYS (indicated by symbol 818). If the flag LGCKAF is set, the units digit of the previously calculated tenative total weight of the stuffed envelope for the particular customer is obtained and placed in XR OA (step 804). If the units digit (i.e. the XR OA contents) is greater than or equal to 3, processing jumps to an instruction at location LCAEX (symbol 822) since it has already been determined that the envelope will be overweight and all that remains is to put an output word indicative of the same (MSB set) in an appropriate output address.

After the units digit is obtained in step 804, the tenths digit and hundredths digit of the calculated tenative total stuffed envelope weight for the customer are obtained and put in XRs OC and OD, respectively (steps 810 and 812). Next, it is necessary to obtain the total number of long length items fed from the feeder 32. This number is stored in a two word format, the tens digit of the number being stored at address FDRLCC+1 and the units digit being stored at address FDRLCC.

If the tens digit of the number of long check items is zero (determined at step 824), then processing can jump to symbol 830 where only the units digit need be considered. If, however, the tens digit is nonzero, then a value representing the per item tenths ounce difference between a short length item and a long length item is obtained from address FLOTEN. It will be recalled that the routine TOZ, described earlier, computes the difference between the tenths digit input value of the long length item for station 32 and the tenths digit input value of the short length item for station 32 and puts the difference into location FLOTEN. The difference between the hundredths digit input values was put into location FLOHUN by TOZ.

Having obtained the value from address FLOTEN, routine LCA calls the routine X10 (step 828). Routine X10, described in detail earlier, basically calls the routine CAL (the internal loop of routine CAL being executed a number of times related to the value at address FDRLCC+1) and multiples the result—summation of the respective values FLOTEN and FLOHUN, each summed a number of times equal to the value of FDRLCC+1—by a factor of ten.

Once the tens digit of the number of long length items has been considered, a determination is made whether the units digit is zero (step 832). If the units digit is zero, processing jumps to an instruction at location LCA4A (symbol 838). Otherwise, preparations are made for a call to CAL (step 840) with respect to the units digit. These preparations include: (1) putting the value at address FLOTEN into RP 2 (step 834), and (2) constructing a loop index for CAL in XR 8 based on the value at address FDRLCC (step 836). The routine CAL performs as described above, obtaining summations of the values FLOTEN and FLOHUN, each summed a number of times equal to the value of FDRLCC. Routine CAL then returns the calculated final units digit weight in XR OA, the calculated final tenths digit weight in XR OC, and the calculated final hundredths digit weight in XR OD. These final weights thus include modifications made by virtue of the difference in weight between long length items and short length items fed from feeder 32.

After routine LCA calls the routine CAL and calculated final weight digits are returned in registers OA, OC, and OD from routine CAL, routine LCA calls routine OZS. Routine OZS basically functions to prepare an output word whose contents determines the destination of the customer's stuffed envelope with respect to postage categorization. In this regard, the routine OZS in conjunction with its subroutine OZSSB sets a binary 9 in the output word if the stuffed envelope is overweight (thus to be directed toward conveyor 76 and marked); the binary 2 bit in the output word if the stuffed envelope is in the 2.00 ounce to 2.99 ounce range (and thus to be directed toward an enabled first postage meter 84); the binary 4 bit in the output word if the stuffed envelope is in the 0.00 ounce to 0.99 ounce range (and thus to be directed toward an enabled second postage meter 88); or the binary 8 bit (MSB) if the stuffed envelope is in the 1.00 to 1.99 ounce range (and thus to be directed toward the conveyor 76 but not marked), In the above regard, the routine OZS (called in step 842) determines which bit in the output word is to be set. The determination is based on a comparision of the calculated final units digit weight in XR OA with the pre-set values OZHI, OZMID, and OZLOW. In addition, the contents of DIVMDE (indicative of the switch 147 which determines whether low range or mid range weight mail is to be diverted onto conveyor 90) is taken into consideration. The output word from routine OZS is then placed into an appropriate output address (step 848). Thereafter, routine LCA returns processing to the master routine SYS (as indicated by symbol 850).

Master routine SYS checks the output address which contains the output word returned from routine OZS at appropriate points in the machine cycle to determine whether the diversion gate 62, postage meter 84, diversion gate 64, or postage meter 88 should be activated for this customer's stuffed envelope. If, for example, the output word has its LSB set, the microprocessor 120 instructs I/O unit 136 to activate solenoid 68 to move diversion gate 62 into the path of conveyor 60 and thus divert a stuffed envelope calculated to be overweight onto the conveyor 76. The foregoing bit-by-bit description of the output word from routine OZS enables one skilled in the art to understand how the microprocessor 120 through I/O unit 136 activates the solenoids 85, 70, and 89 for differing configurations of the output word and with respect to the postage meters 84 and 88 as well as the diversion gate 64.

While the invention has been particularly shown and described with reference to the preferred embodiments thereof, it will be understood by those skilled in the art that various alterations in form and detail may be made herein without departing from the spirit and scope of the invention.

The embodiments of the invention in which an exclusive property or privilege is claimed are defined as follows:

1. In an insertion machine of the type in which an insertion track moves groups of items past a different one of a plurality of feed stations during each machine cycle, said plurality of feed stations being adapted to selectively feed items onto said track for inclusion with a group of said items, wherein the improvement comprises:

data processing means including memory means and arithmetic logic means;

means for selectively inputting into said data processing memory means with respect to each selected station a predetermined value indicative of the per item weight of items held at said station;

means including said data processing arithmetic logic means for using said predetermined values indicative of the per item weight of items held in said feed stations to obtain a calculated total weight for each group of items; and, means for using said calculated weight total to determine how each group of items is to be processed by the insertion machine relative to the application of postage to an envelope associated with said group of items.

2. The apparatus of claim 1, further comprising:

at least one postage meter responsively connected to said means which determines how each group of items is to be processed relative to the application of postage, said postage meter being settable to apply postage to an envelope associated with a group of items.

3. The apparatus of claim 2, further comprising:

at least one diversion device for diverting an envelope associated with a group of items, said diversion device being responsively connected to said means which determines how each group of items is to be processed relative to the application of postage whereby said diversion device is activated to divert said envelope if the calculated weight of said envelope does not fall within an associated weight range of said postage meter.

4. The apparatus of claim 1, further comprising:

a plurality of postage meters positioned whereby a selected one of said postage meters is activatable to apply postage to an envelope associated with a group of items, each of said postage meters being settable to apply appropriate postage for an associated range of calculated weights, each of said postage meters being responsively connected to said means which determines how each group of items is to be processed relative to the application of postage.

5. A method of selectively determining the amount of postage to be applied to each of a plurality of envelopes into which items are inserted by an insertion machine, said insertion machine being of the type in which an insertion track moves groups of items past a different one of a plurality of feed stations during each machine cycle, said plurality of feed stations including a first feed station from which a master control item is fed onto said track and further feed stations from which items are selectively fed in accordance with indicia on said master control item onto said track for inclusion with a group including said master control item, said method comprising the steps of:

reading said indicia;

determining from said indicia on said master control item the particular further feed stations from which items are to be fed onto said insertion track during an appropriate subsequent machine cycle for inclusion with said group including said master control item;

means for determining from said indicia on said master control item the number of items to be fed from at least one such further feed station during said appropriate cycle for inclusion in said group;

storing a value indicative of the number of items to be fed from said further feed station for inclusion with said group;

selectively inputting into said data processing memory means with respect to each selected station a predetermined value indicative of the per item weight of items held at said station;

using said stored values indicative of the number of items fed from a feed station and said predetermined value indicative of the per item weight of items held in said feed station to obtain a calculated subtotal weight with respect to said feed station;

using calculated subtotal weights for a plurality of said stations to obtain a calculated total weight; and using said calculated total weight to determine how each group of items is to be processed by the insertion machine relative to the application of postage to an envelope associated with said group of items.

6. The method of claim 5, further comprising the steps of:

setting at least one postage meter to apply appropriate postage for a calculated weight; and, actuating said postage meter to apply postage to a stuffed envelope associated with a group of items, said postage meter being responsively connected to said means which determines how each group of items is to be processed relative to the application of postage.

7. The method of claim 6, further comprising the step of:

activating a diversion device to divert said stuffed envelope it the calculated weight of said stuffed envelope does not lie within an associated weight range of said postage meter, said diversion device being responsively connected to said means which determines how each group of items is to be processed relative to the application of postage.

8. The method of claim 5, further comprising the steps of:

setting each of a plurality of postage meters to apply appropriate postage for an associated range of calculated weights; and, activating an appropriate one of said plurality of postage meters to apply postage to said stuffed envelope associated with said group of items if the calculated weight of said stuffed envelope lies in said associated range, said plurality of postage meters each being responsively connected to said means which determines how each group of items is to be processed relative to the application of postage.

9. In an insertion machine of the type in which an insertion track moves groups of items past a different one of a plurality of feed stations during each machine cycle, said plurality of feed stations including a first feed station from which a master control item is fed onto said track and further feed stations from which items are selectively fed in accordance with indicia on said master control item onto said track for inclusion with a group including said master control item, wherein the improvement comprises:

means for reading said indicia;

means for determining from said indicia on said master control item the particular further feed stations from which items are to be fed onto said insertion track during an appropriate subsequent machine cycle for inclusion with said group including said master control item;

means for determining from said indicia on said master control item the number of items to be fed from at least one such further feed station during said appropriate cycle for inclusion in said group;

data processing means including memory means and arithmetic logic means for storing in said data processing memory means a value indicative of the number of items to be fed from said further feed station for inclusion with said group;

means for selectively inputting into said data processing memory means with respect to each selected station a predetermined value indicative of the per item weight of items held at said station;

means including said data processing arithmetic logic means for using said stored values indicative of the number of items fed from a feed station and said predetermined values indicative of the per item weight of items held in said feed station to obtain a calculated subtotal weight with respect to said feed station;

means including said data processing arithmetic logic means for using calculated subtotal weights for a plurality of said stations to obtain a calculated total weight; and, means for using said calculated total weight to determine how each group of items is to be processed by the insertion machine relative to the application of postage to an envelope associated with said group of items.

10. The apparatus of claim 3 further comprising:

sensing means positioned proximate one of said plurality of feed stations, said sensing means being adapted to sense a weight-influencing characteristic of said items and to discriminate on the basis of said characteristic between an item on a first weight and an item of a second weight fed from said feed station;

means for determining and storing a number of first weight items and a number of second weight items fed from said station;

means for selectively inputting into said data processing memory means with respect to said station near which said sensing means is proximate both a first predetermined value indicative of the per item weight of each of said first weight items held at said station and a second predetermined value indicative of the per item weight of each of said second weight items held at said station;

means for using said predetermined per item weight values item and short item per weights and said stored values indicative of the number of respective first weight items and second weight items to calculate a station subtotal weight.

11. The apparatus of claim 10, wherein said weight-influencing characteristic is item length.

12. The apparatus of claim 9, further comprising:

at least one postage meter responsively connected to said means which determines how each group of items is to be processed relative to the application of postage, said postage meter being settable to apply postage to an envelope associated with a group of items.

13. The apparatus of claim 12, further comprising:

at least one diversion device for diverting an envelope associated with a group of items, said diversion device being responsively connected to said means which determines how each group of items is to be processed relative to the application of postage whereby said diversion device is activated to divert said envelope if the calculated weight of said envelope does not fall within an associated weight range of said postage meter.

14. The apparatus of claim 9, further comprising:

a plurality of postage meters positioned whereby a selected one of said postage meters is activatable to apply postage to an envelope associated with a group of items, each of said postage meters being settable to apply appropriate postage for an associated range of calculated weights, each of said postage meters being responsively connected to said means which determines how each group of items is to be processed relative to the application of postage.

15. A method of selectively determining a weight classification range for envelopes into which items are inserted by an insertion machine, said insertion machine being of the type in which an insertion track moves groups of items past a different one of a plurality of feed stations during each machine cycle, said plurality of feed stations including a first feed station from which a master control item is fed onto said track and further feed stations from which items are selectively fed in accordance with indicia on said master control item onto said track for inclusion with a group including said master control item, at least one of said further feed stations being a dual item feed station from which both items of a first weight and items of a second weight can be fed, a sensor means being proximate said dual item feed station to sense a weight-influencing characteristic of said items and to discriminate on the basis of said characteristic between items of said first weight and items of said second weight, said method comprising the steps of:

selectively inputting with respect to each selected station a predetermined value indicative of the per item weight of items fed from said station;

selectively inputting with respect to said dual station a predetermined value indicative of the per item weight of first weight items held at said dual station and a second predetermined value indicative of the per item weight of second weight items held at said dual station;

reading said indicia on said master control item;

determining from said indicia on said master control item the particular further feed stations from which items are to be fed onto said insertion track during an appropriate subsequent machine cycle for inclusion with said group including said master control item;

determining from said indicia on said master control item the number of items to be fed from each such further feed station during said appropriate cycle for inclusion in said group;

storing a value indicative of the number of items to be fed from each such further feed station for inclusion with said group;

using said second predetermined value indicative of the per item weight of second weight items held at said dual station and the stored value indicative of the total number of items to be fed from said dual station to obtain a tentative calculated subtotal weight for said dual station;

using said predetermined values indicative of the per item weight of items held in each station other than said dual station and the stored values indicative of the number of items fed from each respective station to obtain a calculated subtotal weight with respect to each station other than said dual length station;

using said tentative calculated subtotal weight for said dual station and said calculated subtotal weights for each of said other stations to obtain a calculated tentative total weight;

determining the number of first weight items fed from said dual station;

obtaining a correction factor to be used to modify said calculated tentative total weight, said correction factor being essentially the product of the number of first weight items fed from said dual station and a quantity representing the difference between the first predetermined value and the second predetermined value indicative of the per item weights of said first weight and said second weight items, respectively;

using said correction factor to modify said calculated tentative total weight to obtain a calculated total weight; and, using said calculated total weight to determine how each group of items is to be processed by the insertion machine relative to the application of postage to an envelope associated with said group of items.

16. The method of claim 15, further comprising the step of comparing the calculated tentative total weight to a maximum weight value.

17. The method of claim 15, wherein said weight-influencing characteristics is item length.

18. The method of claim 17, wherein said items of said first weight are relatively long length items and wherein items of said second weight are relatively short length items.

19. A method of determining the amount of postage to be applied to envelopes into which items are inserted by an insertion machine, said insertion machine being of the type in which an insertion track moves groups of items past a different one of a plurality of feed stations during each machine cycle, said plurality of feed stations being adapted to selectively feed items onto said track for inclusion with a group of said items, said method comprising the steps of:

selectively inputting into data processing memory means with respect to each selected station a predetermined value indicative of the per item weight of items held at said station;

using said predetermined values indicative of the per item weight of items held in said feed stations to obtain a calculated weight total for each group of items; and, using said calculated weight total to determine how each groups of items is to be processed by the insertion machine relative to the application of postage to an envelope associated with said group of items.

20. The method of claim 19, further comprising the steps of:

setting each of a plurality of postage meters to apply appropriate postage for an associated range of calculated weights; and, activating an appropriate one of said plurality of postage meters to apply postage to said stuffed envelope associated with said group of items if the calculated weight of said stuffed envelope lies in said associated range, said plurality of postage meters each being responsively connected to said means which determines how each group of items is to be processed relative to the application of postage.

21. The method of claim 19, further comprising the steps of:

setting at least one postage meter to apply appropriate postage for a calculated weight; and, actuating said postage meter to apply postage to a stuffed envelope associated with a group of items, said postage meter being responsively connected to said means which determines how each group of items is to be processed relative to the application of postage.

22. The method of claim 21, further comprising the step of:

activating a diversion device to divert said stuffed envelope if the calculated weight of said stuffed envelope does not lie within an associated weight range of said postage meter, said diversion device being responsively connected to said means which determines how each group of items is to be processed relative to the application of postage.

23. In an insertion machine of the type in which an insertion track moves groups of items past a different one of a plurality of feed stations during each machine cycle, said plurality of feed stations being adapted to selectively feed items onto said track for inclusion with a group of said items, wherein the improvement comprises:

means for selectively inputting predetermined values into a memory, said predetermined values including at least a predetermined value indicative of the per item weight of items held at a first feed station and a predetermined value indicative of the per item weight of items held at a second feed station;

means for calculating a calculated total weight for a group of items, said calculation means being connected to said memory whereby said predetermined values are utilized in said calculation; and, means for using said calculated total weight to determine how a group of items is to be further processed.

24. The apparatus of claim 23, further comprising:

at least one diversion device for diverting an envelope associated with a group of items, said diversion device being responsively connected to said means which determines how a group of items is to be further processed.

25. The apparatus of claim 24, wherein said means for using said calculated weight total determines how a group of items is to be processed by the insertion machine relative to the application of postage to an envelope associated with said group of items.

26. The apparatus of claim 25, further comprising:

at least one postage meter responsively connected to said means which determines how a group of items is to be processed relative to the application of postage, said postage meter being settable to apply postage to an envelope associated with a group of items.

27. The apparatus of claim 25, further comprising:

a plurality of postage meters positioned whereby a selected one of said postage meters is activatable to apply postage to an envelope associated with a group of items, each of said postage meters being settable to apply appropriate postage for an associated range of calculated weights, each of said postage meters being responsively connected to said means which determines how a group of items is to be processed relative to the application of postage.

28. A method of determining how envelopes into which items are inserted by an insertion machine are to be further processed, said insertion machine being of the type in which an insertion track moves groups of items past a different one of a plurality of feed stations during each machine cycle, said plurality of feed stations being adapted to selectively feed items onto said track for inclusion with a group of said items, said method comprising the steps of:

selectively inputting predetermined values into a memory, said predetermined values including at least a predetermined value indicative of the per item weight of items held at a first feed station and a predetermined value indicative of the per item weight of items held at a second feed station;

calculating a calculated total weight for a group of items, said predetermined values being utilized in said calculation; and, using said calculated total weight to determine how a group of items is to be further processed.

29. The method of claim 28, further comprising the step of:

using at least one diversion device for diverting an envelope associated with a group of items, said diversion device being responsively connected to said means which determines how a group of items is to be further processed.

30. The method of claim 29, wherein said step of using said calculated weight total includes the step of determining how a group of items is to be processed by the insertion machine relative to the application of postage to an envelope associated with said group of items.

31. The method of claim 30, further comprising the step of:

setting at least one postage meter to apply postage to an envelope associated with a group of items, said postage meter responsively connected to said means which determines how a group of items is to be processed relative to the application of postage.

32. The apparatus of claim 30, further comprising the step of:

positioning a plurality of postage meters whereby a selected one of said postage meters is activatable to apply postage to an envelope associated with a group of items, each of said postage meters being settable to apply appropriate postage for an associated range of calculated weights, each of said postage meters being responsively connected to said means which determines how a group of items is to be processed relative to the application of postage.

33. A method of selectively determining the amount of postage to be applied to a plurality of envelopes into which items are inserted by an insertion machine, said insertion machine being of the type in which an insertion track moves groups of items past a different one of a plurality of feed stations during each machine cycle, said plurality of feed stations including a first feed station from which a master control item is fed onto said track an further feed stations from which items are selectively fed in accordance with indicia on said master control item onto said track for inclusion with a group including said master control item, said method comprising the steps of:

reading said indicia;

means for determining from said indicia on said master control items the number of items to be fed from at least one such further feed station during an appropriate machine cycle for inclusion in said group;

storing in a memory a value indicative of the number of items to be fed from said further feed station for inclusion with said group;

selectively inputting predetermined values into said memory, said predetermined values including at least a predetermined value indicative of the per item weight of items held at said first feed station and a predetermined value indicative of the per item weight of items held at said further feed station;

using said stored values indicative of the number of items fed from a feed station and said predetermined values indicative of the per item weight of items held in said feed station to obtain a calculated subtotal weight with respect to said feed station;

using calculated subtotal weights for a plurality of said stations to obtain a calculated total weight; and, using said calculated total weight to determine how a group of items is to be further processed.

34. The method of claim 33, wherein said step of using said calculated weight total includes determining how a group of items is to be processed by the insertion machine relative to the application of postage to an envelope associated with said group of items.

35. In an insertion machine of the type in which an insertion track moves groups of items past a different one of a plurality of feed stations during each machine cycle, said plurality of feed stations including a first feed station from which a master control item is fed onto said track and further feed stations from which items are selectively fed in accordance with indicia on said master control item onto said track for inclusion with a group including said master control item, wherein the improvement comprises:

means for reading said indicia;

means for determining from said indicia on said master control item the number of items to be fed from at least one such further feed station during an appropriate machine cycle for inclusion in said group;

a memory for storing a value indicative of the number of items to be fed from said further feed station for inclusion with said group;

means for selectively inputting predetermined values into said memory, said predetermined values including at least a predetermined value indicative of the per item weight of item held at a first feed station and a predetermined value indicative of the per item weight of items held at said further feed station;

means for using said stored values indicative of the number of items fed from a feed station and said predetermined values indicative of the per item weight of items held in said feed station to obtain a calculated subtotal weight with respect to said feed station;

means for using calculated subtotal weights for a plurality of said stations to obtain a calculated total weight; and, means for using said calculated total weight to determine how a group of items is to be further processed.

36. The apparatus of claim 35, further comprising:

sensing means positioned proximate one of said plurality of feed stations, said sensing means being adapted to sense a weight-influencing characteristic of said items and to discriminate on the basis of said characteristic between an item of a first weight and an item of a second weight fed from said feed station;

means for determining and storing a number of first weight items and a number of second weight items fed from said station;

means for selectively inputting into said memory with respect to said station near which said sensing means is proximate both a first predetermined value indicative of the per item weight of each of said first weight items held at said station and a second predetermined value indicative of the per item weight of each of said second weight items held at said station; and, means for using said predetermined per item weight values and said stored values indicative of the number of respective first weight items and second weight items to calculate a station subtotal weight.

37. The apparatus of claim 36, wherein said weight-influencing characteristic is item length.

38. The apparatus of claim 35, wherein said means for using said calculated weight total determines how a group of items is to be processed by the insertion machine relative to the application of postage to an envelope associated with said group of items.

* * * * *

UNITED STATES PATENT AND TRADEMARK OFFICE
Certificate

Patent No. 4,571,925 Patented: Feb. 25, 1986

On petition requesting issuance of a certificate for correction of inventorship pursuant to 35 U.S.C. 256, it has been found that the above-identified patent, through error and without any deceptive intent, improperly sets forth the inventorship. Accordingly, it is hereby certified that the correct inventorship of this patent is:
Jerryl Adams, Dwight W. Aten and Vern Jordan.

Signed and Sealed This 9th Day of January 1990.

ROBERT L. SPRUILL

*Supervisory Patent Examiner*
*Art Unit 321*